US008041056B2

(12) United States Patent
Kinoshita

(10) Patent No.: US 8,041,056 B2
(45) Date of Patent: Oct. 18, 2011

(54) VOLTAGE SUPPLY CIRCUIT AND MICROPHONE UNIT COMPRISING THE SAME

(75) Inventor: Hiroshige Kinoshita, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 1331 days.

(21) Appl. No.: 11/203,968

(22) Filed: Aug. 16, 2005

(65) Prior Publication Data

US 2006/0062406 A1 Mar. 23, 2006

(30) Foreign Application Priority Data

Aug. 17, 2004 (JP) ................................ 2004-237518
Jun. 22, 2005 (JP) ................................ 2005-182541

(51) Int. Cl.
*H04R 3/00* (2006.01)
*G06F 7/556* (2006.01)
*G06G 7/24* (2006.01)

(52) U.S. Cl. ......... 381/113; 381/111; 381/122; 327/350

(58) Field of Classification Search .................. 381/122, 381/111, 112–115, 120, 95; 327/350, 534–537; 330/95, 297, 96, 296; 257/299; 455/127.1
See application file for complete search history.

(56) References Cited

U.S. PATENT DOCUMENTS 5,260,643 A * 11/1993 Sandhu ......................... 323/225
6,194,954 B1 2/2001 Kim et al.
7,634,096 B2 * 12/2009 Fallesen ........................ 381/113
2006/0008097 A1 * 1/2006 Stenberg et al. .............. 381/113

FOREIGN PATENT DOCUMENTS

JP 8087168 A 4/1996
JP 2005192181 A 7/2005

OTHER PUBLICATIONS

"PA acoustic system", Kougakutosho Ltd., 1996, pp. 29-30.

* cited by examiner

*Primary Examiner* — Vivian Chin
*Assistant Examiner* — Douglas Suthers
(74) *Attorney, Agent, or Firm* — Sughrue Mion, PLLC

(57) ABSTRACT

A voltage supply circuit comprises a voltage control circuit for outputting a bias voltage control signal according to a set value based on a bias voltage of a sensor and a voltage generation circuit for generating the bias voltage to be applied to the sensor based on the bias voltage control signal.

16 Claims, 19 Drawing Sheets

VOLTAGE SUPPLY CIRCUIT AND MICROPHONE UNIT COMPRISING THE SAME

BACKGROUND OF THE INVENTION

1. Field of the Invention

The present invention relates to a voltage supply circuit for supplying voltage to a sensor such as a condenser microphone, and a microphone unit comprising the same.

2. Description of the Related Art

For voice communication in portable terminals, such as portable telephones, a technology using a microphone, called a condenser microphone, has been popularized. A condenser microphone is sometimes called a capacitor microphone or an electrostatic microphone. In a condenser microphone, one electrode of a capacitor is a diaphragm. This diaphragm detects the vibration of voice as a change of capacitance, and converts it into electric signals. A conventional microphone unit is disclosed in "PA acoustic system, (Kougakutosho Ltd., 1996)"

FIG. 1 shows a circuit of a condenser microphone unit 100 using a conventional condenser microphone. As FIG. 1 shows, the conventional condenser microphone unit comprises a condenser microphone 101, JFET (Junction Field Effect Transistor) 102, capacitor 103, resistors 104 and 105 and DC power supplies 106 and 108.

The condenser microphone 101 is a vibration sensor for generating output signals corresponding to the sound pressure of voice to be input. One electrode of the condenser microphone 101 is connected to the DC power supply 108 via the resistor 104, and the other electrode is grounded. A predetermined bias voltage is supplied by the DC power supply 108 to the condenser microphone 101. The output of the condenser microphone 101 is connected to the gate of the JFET 102. The JFET 102 is an amplification circuit for amplifying the output signals of the condenser microphone and generating the amplification signals. The amplification signals generated by the JEFT 102 are output via the output terminal 107.

In this condenser microphone unit, manufacturing dispersion occurs when the condenser microphone and the JFET are manufactured. This manufacturing dispersion appears as the dispersion of the inter-electrode distance of the capacitor and the dispersion of the amplification efficiency of the JFET. This manufacturing dispersion becomes a cause of the sensitivity dispersion of each condenser microphone unit.

A voltage supply circuit for supplying voltage to the sensor device, such as a condenser microphone, such that the sensor device can operate at an appropriate sensitivity even if manufacturing dispersion occurs, has been desired. Also a condenser microphone unit that can operate at an appropriate sensitivity according to the dispersion has also been desired.

To switch the sensitivity of the condenser microphone unit in a conventional condenser microphone unit, two condenser microphone units with different sensitivity settings are provided. The sensitivity is switched by switching the condenser microphone unit itself. With this configuration, however, a condenser microphone unit must be provided according to the levels of sensitivity to be switched. Therefore a condenser microphone unit that can select a plurality of sensitivities in one condenser microphone unit has been desired.

SUMMARY OF THE INVENTION

According to an aspect of the present invention, a voltage supply circuit comprises a voltage control circuit for outputting a bias voltage control signal according to a set value based on a bias voltage of a sensor and a voltage generation circuit for generating the bias voltage to be applied to the sensor based on the bias voltage control signal.

According to another aspect of the present invention, a microphone unit comprises a microphone to which bias voltage is supplied a voltage generation circuit for boosting the power supply voltage and generating the bias voltage based on a bias voltage control signal and a voltage control circuit for outputting the bias voltage control signal based on a set value of the bias voltage.

According to another aspect of the present invention, a sensitivity adjustment method for a microphone unit, which comprises a condenser microphone, an amplification circuit and a voltage supply circuit which supplies a bias voltage based on a set value to the condenser microphone, comprises detecting a difference between a reference voltage and an output voltage of the condenser microphone, outputting a sensitivity adjustment instruction, adjusting the output voltage based on the sensitivity adjustment instruction and storing a control signal corresponding to the adjusted output voltage as the set value.

According to another aspect of the present invention, a sensitivity adjustment device for a microphone unit, which comprises a condenser microphone and a voltage supply circuit which supplies a bias voltage based on a set value to the condenser microphone, comprises a comparator which compares an output voltage of the condenser microphone with a reference voltage and a control instruction generation circuit which outputs a sensitivity adjustment instruction for adjusting the output voltage of the condenser microphone based on the reference voltage, and outputs a storing instruction for storing the set value based on the adjusted output voltage.

BRIEF DESCRIPTION OF THE DRAWINGS

The above and other objects, advantages and features of the present invention will be more apparent from the following description taken in conjunction with the accompanying drawings, in which.

PREFERRED EMBODIMENTS OF THE INVENTION

The invention will be now described herein with reference to illustrative embodiments. Those skilled in the art will recognize that many alternative embodiments can be accomplished using the teachings of the present invention and that the invention is not limited to the embodiments illustrated for explanatory purposed.

First Embodiment

Figure 1:
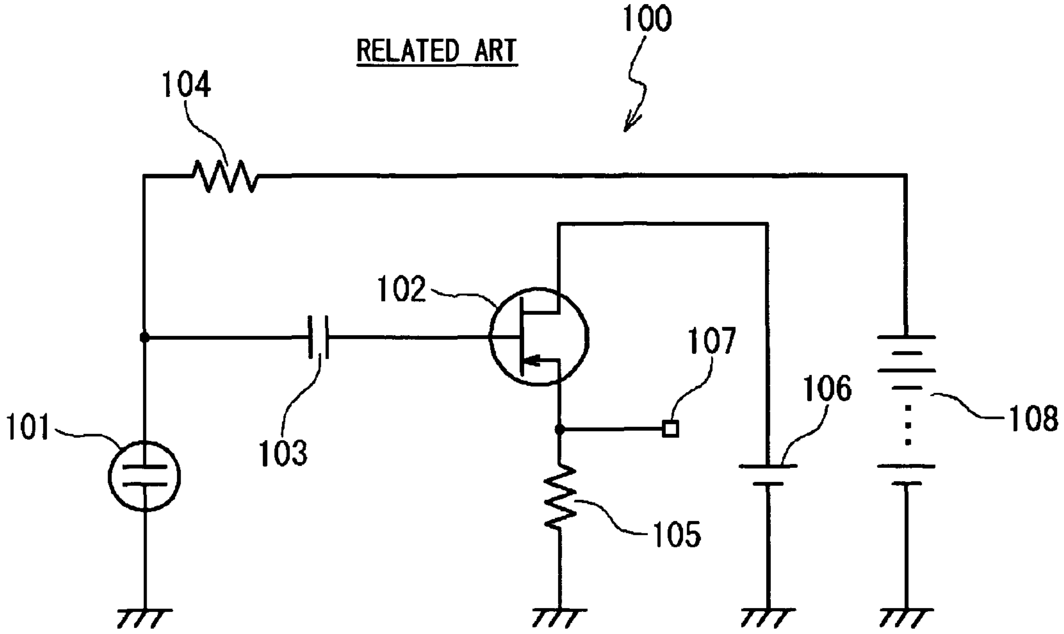
FIG. 1 shows a circuit of a condenser microphone unit 100 using a conventional condenser microphone.
Figure 2:
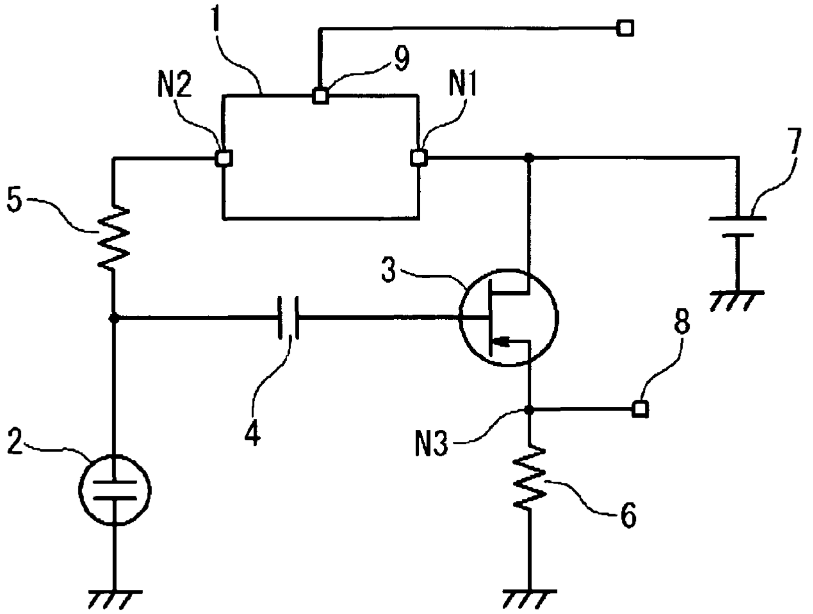
FIG. 2 is a block diagram depicting the configuration of the microphone unit according to a first embodiment of the present invention.

FIG. 2 is a block diagram depicting the configuration of the microphone unit according to a first embodiment of the present invention. As FIG. 2 shows, the microphone unit according to the first embodiment comprises a voltage supply circuit 1, condenser microphone 2, amplification circuit 3, capacitor 4 and resistors 5 and 6.

The voltage supply circuit 1 generates the bias voltage so that the sensitivity of the condenser microphone 2 becomes a predetermined sensitivity, and supplies it to the condenser microphone 2. The voltage supply circuit 1 is connected to the power supply 7 via the first node N1. The voltage supply circuit 1 generates the bias voltage based on the power supply voltage of this power supply 7. This bias voltage is output from the second node N2, and is applied to the condenser microphone 2 via the resistor 5.

The condenser microphone 2 is a type of sensor (vibration sensor). The sensitivity of the condenser microphone 2 is set according to the bias voltage. The condenser microphone 2 comprises a diaphragm (electrode) and back electrode. Bias voltage is applied on the back electrode. The diaphragm vibrates responding to the sound pressure of the voice to be input. In the condenser microphone 2, the distance between the electrodes changes as the diaphragm vibrates. The capacitance of the condenser microphone 2 changes in response to the changes of the inter-electrode distance. By the change of the charges stored in the condenser microphone 2, the microphone unit outputs signals responding to the voice to be input. For this microphone unit, sensitivity can be adjusted and changed by controlling the bias voltage of the condenser microphone 2.

The amplification circuit 3 amplifies the output of the condenser microphone 2. In FIG. 2, as an example of the amplification circuit, a circuit comprised of a JFET is shown. The amplification circuit 3 is connected between the power supply 7 and the ground line. The gate of the amplification circuit (JFET) 3 is connected to the condenser microphone 2 via the capacitor 4. The amplification circuit 3 amplifies the signals responding to the signal voltage which is input to the gate. The signals amplified by the amplification circuit 3 are output via the output terminal 8.

Figure 3:
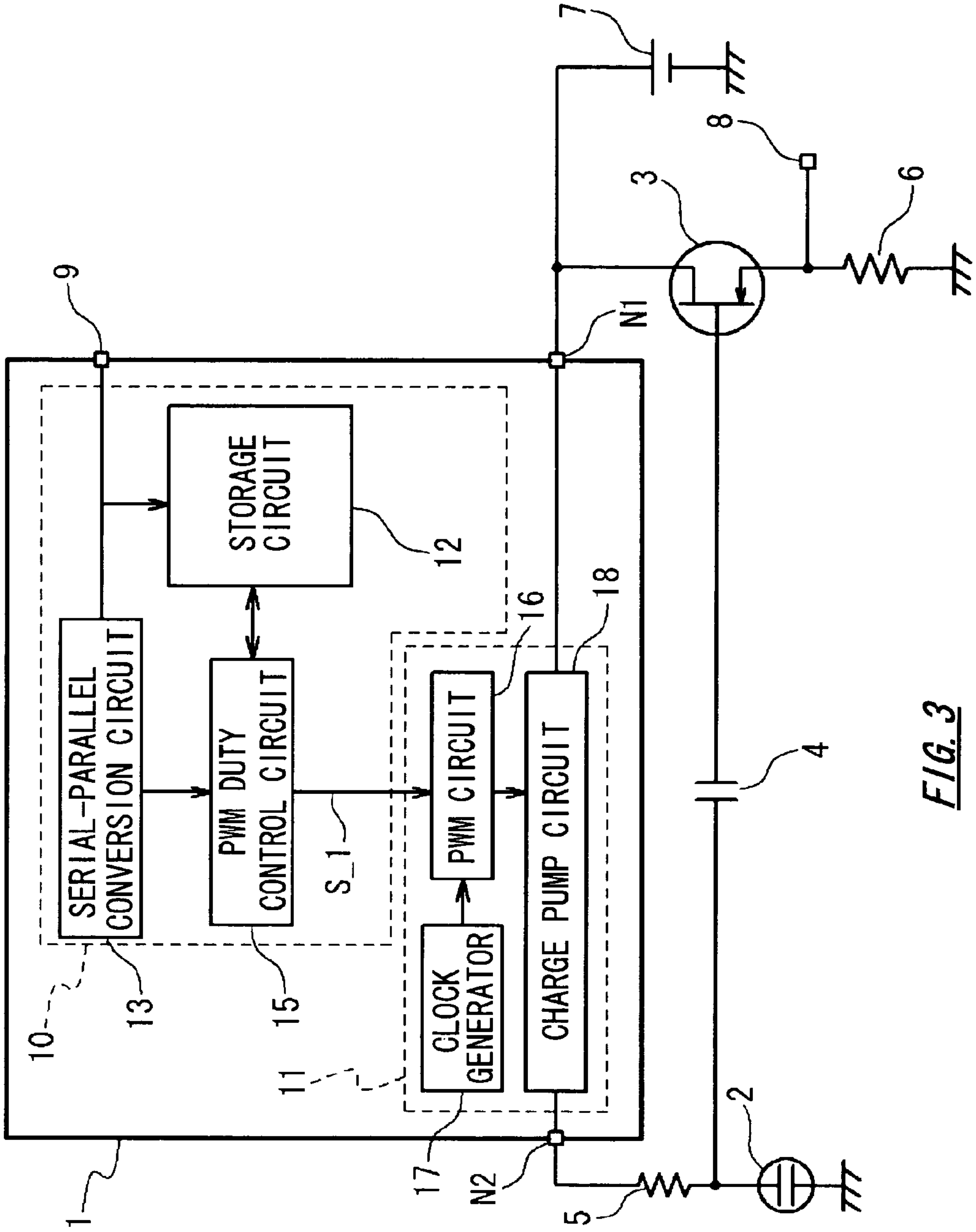
FIG. 3 is a block diagram depicting the voltage supply circuit 1 according to the first embodiment.

FIG. 3 is a block diagram depicting the voltage supply circuit 1 according to the first embodiment. As FIG. 3 shows, the voltage supply circuit 1 comprises the voltage control circuit 10 and the voltage generation circuit 11.

The voltage control circuit 10 has a storage circuit 12 inside. The voltage control circuit 10 outputs the bias voltage control signal S_1 for adjusting sensitivity while the sensitivity of the microphone unit is being adjusted. In the storage circuit 12 inside the voltage control circuit 10, a set value, for outputting a predetermined bias voltage control signal S_1 when the sensitivity adjustment operation ends, is stored. After the sensitivity adjustment operation ends, the voltage control circuit 10 outputs the bias voltage control signal S_1 based on this stored set value. Details on the sensitivity adjustment operation of the microphone unit will be described later. The voltage generation circuit 11 generates the bias voltage responding to the bias voltage control signal S_1.

As FIG. 3 shows, the voltage control circuit 10 includes a storage circuit 12, serial-parallel conversion circuit 13, and PWM duty control circuit 15. The voltage generation circuit 11 includes a PWM circuit 16, clock generator 17 and charge pump circuit 18.

As described above, when the sensitivity adjustment operation is over, the set value of the bias voltage control signal S_1 is written in the storage circuit 12. This set value can be written by inputting a predetermined write setting signal, for example, via the terminal for sensitivity adjustment 9. Based on the set value stored in the storage circuit 12, the bias voltage to be applied to the condenser microphone 2 during normal operation is determined. This storage circuit 12 is connected to the terminal for sensitivity adjustment 9 and the PWM duty control circuit 15.

After the sensitivity adjustment operation ends, the storage circuit 12 operates as a read-only circuit. The set value held in the storage circuit 12 is read to the PWM duty control circuit 15. It is preferable that the storage circuit 12 in the present embodiment is comprised of a non-volatile memory. Specifically the cost of the microphone unit can be decreased by using an EEPROM or polysilicon fuse type memory. The storage circuit 12 is connected to the power supply circuit 7 via the boosting circuit, which is not illustrated.

The serial-parallel conversion circuit 13 converts a serial signal supplied via the terminal for sensitivity adjustment 9 into a parallel signal. The microphone unit of the present embodiment is installed in electronic equipment, such as a portable telephone. In such electronic equipment, each unit in the device transmits/receives data by serial transmission. The serial-parallel conversion circuit 13 outputs the data received via the serial transmission line to the parallel signal, and outputs it to the PWM duty control circuit 15.

The PWM duty control circuit 15 outputs the PWM duty control signal for adjusting the sensitivity of the condenser microphone 2. The PWM duty control signal is a control signal corresponding to the bias voltage control signal S_1, so in the following description, the symbol S_1 is attached to the PWM duty control signal.

A digital signal corresponding to the bias voltage control signal is supplied to the PWM duty control circuit 15 from the serial-parallel conversion circuit 13 or storage circuit 12. The PWM duty control circuit converts a digital signal into an analog signal to be supplied to the PWM circuit 16. Therefore the PWM duty control circuit 15 has a D/A conversion circuit (not illustrated). The PWM duty control circuit 15 generates the PWM duty control signal S_1, which is an analog signal, and outputs it to the PWM circuit 16.

The PWM circuit 16 generates clock pulses having a predetermined duty ratio based on the PWM duty control signal S_1, which is output from the PWM duty control circuit 15. The clock generator 17 supplies a predetermined cycle of clocks to the PWM circuit 16.

The charge pump circuit 18 generates a predetermined voltage responding to the clock pulse supplied from the PWM circuit 16. The voltage generated by the charge pump circuit 18 changes according to the duty of the clocks supplied to the charge pump circuit 18.

Figure 4:
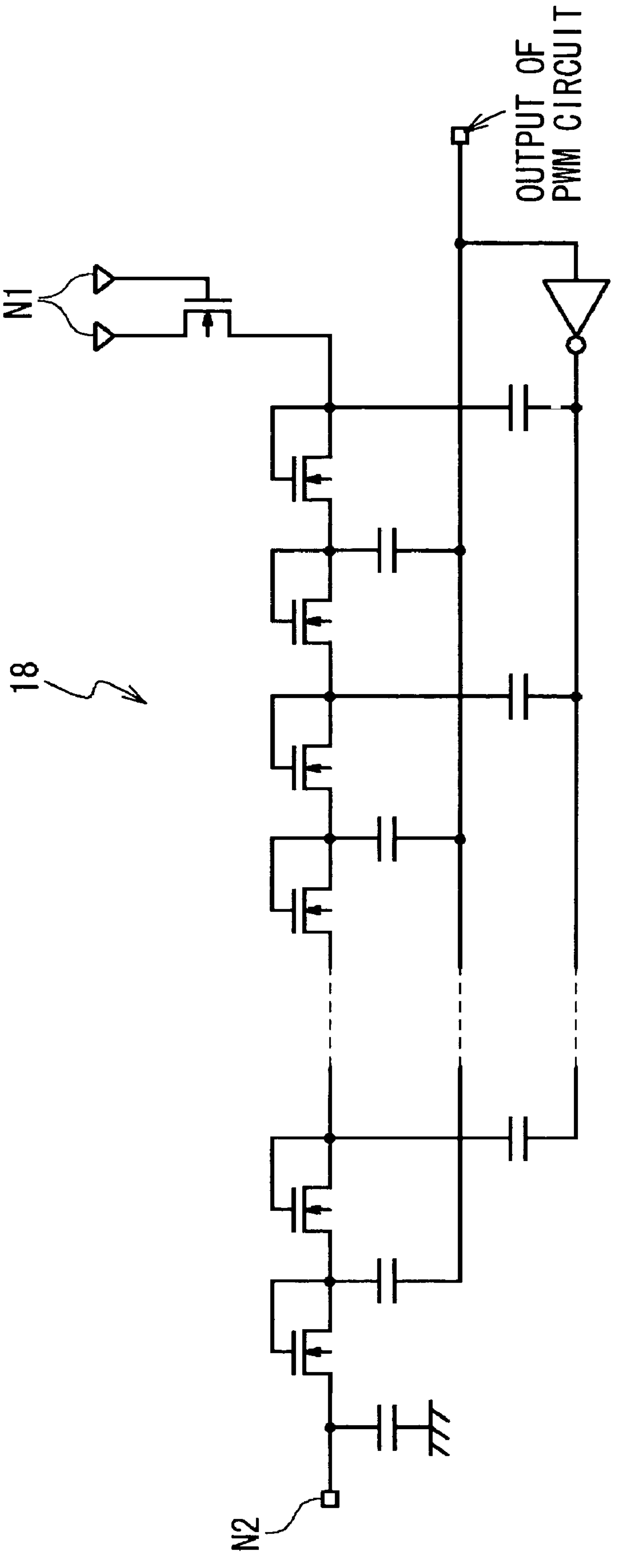
FIG. 4 is a circuit diagram depicting a specific configuration of the charge pump circuit 18.

FIG. 4 is a circuit diagram depicting a specific configuration of the charge pump circuit 18. The charge pump circuit 18 according to the first embodiment comprises FETs (Field Effect Transistors) which are connected in multi-stages, and capacitors which are connected in multi-stages. When the charge pump circuit 18 performs the boosting operation, voltage to be generated is boosted according to the number of stages of FETs and capacitors constituting the charge pump circuit 18. Therefore the number of stages of the charge pump circuit 18 is set according to the value of the power supply voltage to be supplied to the charge pump circuit 18 and the sensitivity of the condenser microphone 2.

More specifically, the voltage to be output from the voltage supply circuit 1 is determined based on the bias voltage required to achieve the target sensitivity of the microphone unit and the width of adjusting the bias voltage. The number of stages of the charge circuit is also determined based on the voltage to be output from this voltage supply circuit.

When the bias voltage of the condenser microphone 2 is generated, the charge pump circuit 18 boosts the power supply voltage. The charge pump circuit sequentially boosts the electric charges charged in the capacitor by the switching operation of the FET. By an operation responding to the clock pulses from the PWM circuit 16, the charge pump circuit 18 generates a desired bias voltage, and applies it to the condenser microphone 2.

Figure 5:
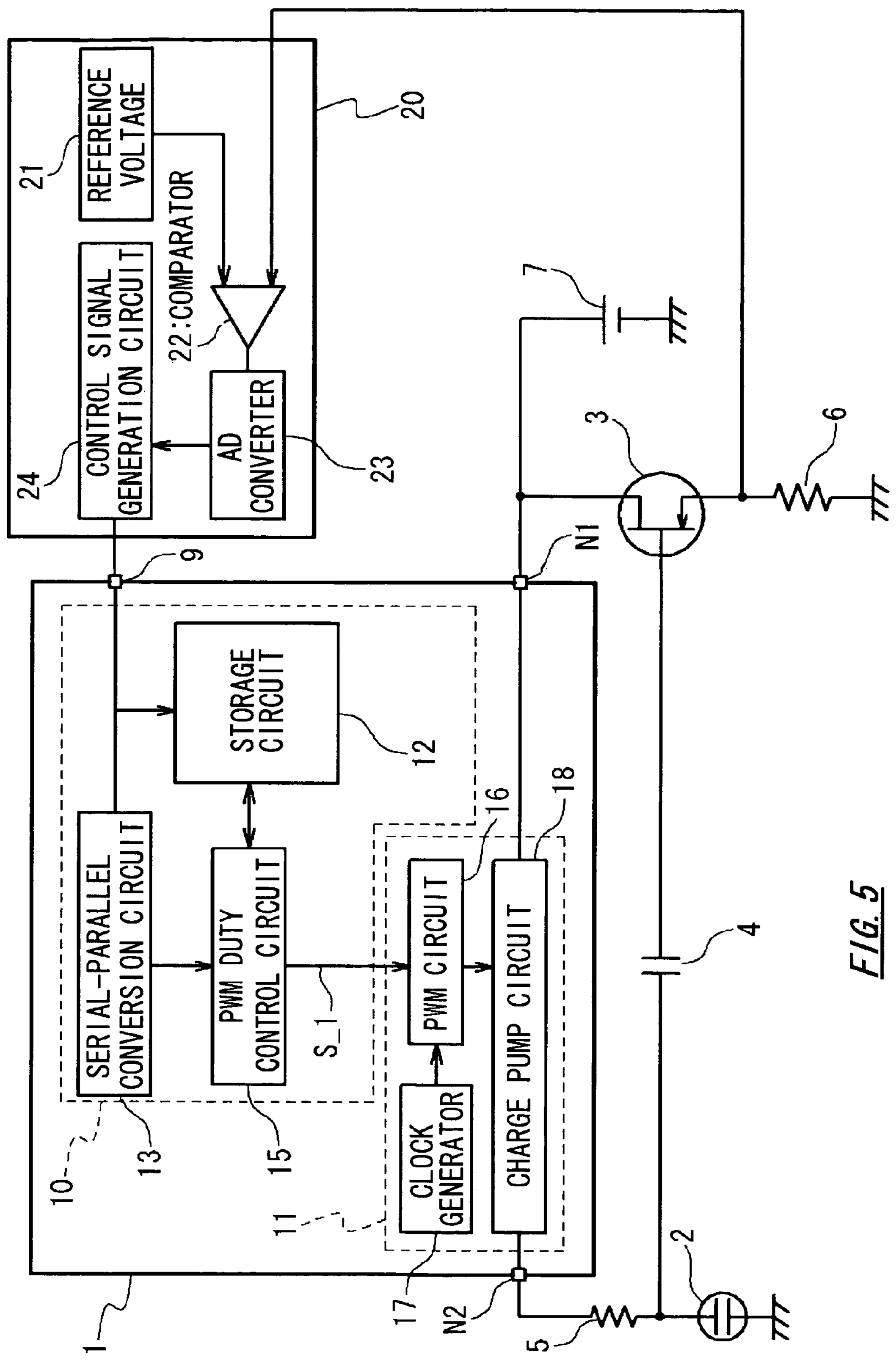
FIG. 5 is a block diagram depicting the configuration when the sensitivity of the microphone unit is adjusted according to the first embodiment.

Now the sensitivity adjustment operation of the voltage supply circuit 1 of the present embodiment will be described. FIG. 5 is a block diagram depicting the configuration when the sensitivity of the microphone unit is adjusted according to the first embodiment. Conventionally if the sensitivity is outside the standard, the microphone unit had to be discarded, but in the present embodiment, the detected sensitivity can be adjusted according to the detected sensitivity. Therefore even if manufacturing dispersion occurs, the number of products conventionally discarded can be dramatically decreased.

When the sensitivity of the microphone unit is adjusted, the microphone unit is connected to the sensitivity adjustment device 20. The sensitivity adjustment device 20 detects the sensitivity of the microphone unit and outputs the control signal for sensitivity adjustment. The sensitivity adjustment device 20 comprises a reference voltage block 21, comparator 22, AD converter 23 and control signal generation circuit 24. The reference voltage block 21 stores the reference voltage values in advance for the sensitivity adjustment device 20 to judge the sensitivity of the microphone unit.

The comparator 22 compares the output voltage of the microphone unit and the reference voltage value held in the reference voltage block 21, and outputs the comparison result. One input terminal of the comparator 22 is connected to the output terminal 8 when the sensitivity of the microphone unit is adjusted. The other input terminal of the comparison circuit 22 is connected to the reference voltage block 21.

The AD converter 23 converts an analog signal which is output from the comparator 22 into a digital signal. The comparator 22 shown in FIG. 5 outputs the above mentioned comparison result using analog signals as the difference of the reference voltage value and the output voltage of the microphone unit. The AD converter 23 converts the analog signal supplied from the comparator 22 into a digital signal corresponding to the analog signal, and supplies it to the control signal generation circuit 24.

The control signal generation circuit 24 generates a control signal based on the signal which is output from the AD converter 23. The control signal generation circuit 24 generates a predetermined control signal based on the comparison result after the digital conversion by the AD converter 23, and supplies it to the voltage supply circuit 1. This control signal includes a setting signal for the PWM duty control circuit 15 and write control signal for the storage circuit, for example.

The first embodiment is the case when the sensitivity adjustment device 20 is externally connected to the microphone unit. If this sensitivity adjustment device can be internally installed in the configuration of the device installing the microphone unit (e.g. portable terminal), the sensitivity adjustment device may be installed inside, which does not limit the configuration and operation of the present invention.

Figure 6:
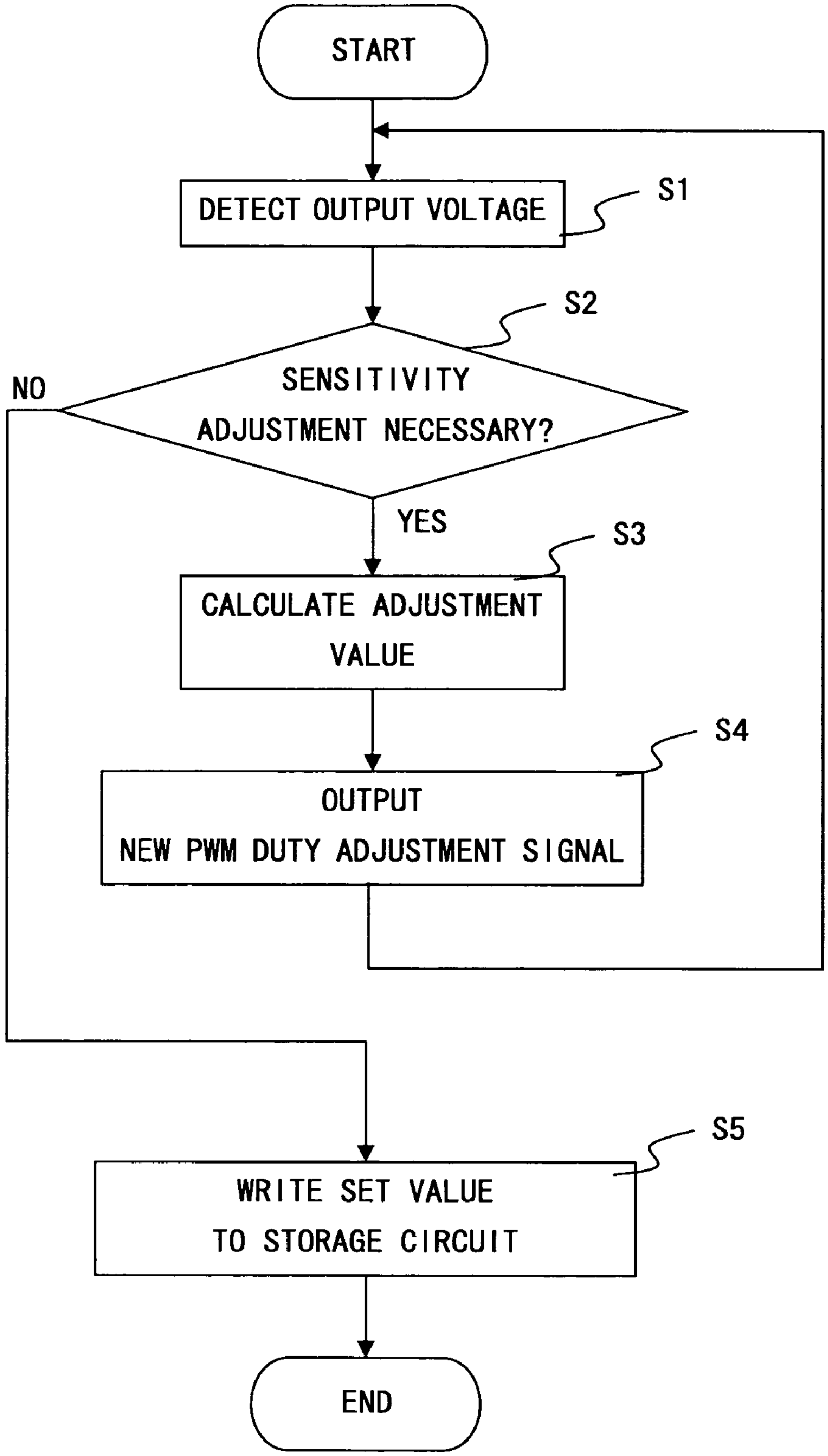
FIG. 6 is a flow chart depicting the sensitivity adjustment operation of the microphone unit according to the first embodiment.

FIG. 6 is a flow chart depicting the sensitivity adjustment operation of the microphone unit according to the first embodiment. Now the sensitivity adjustment operation will be described with reference to FIG. 6.

To perform the sensitivity adjustment operation, the adjustment target microphone unit is connected to the sensitivity adjustment device 20. When the sensitivity adjustment operation starts, a sound signal at a predetermined sound pressure level (unit: dB) is input to the condenser microphone 2 of the microphone unit. The microphone unit outputs an output voltage according to the sound pressure level.

In step S1 in FIG. 6, the sensitivity adjustment device 20 connected to the microphone unit detects the output voltage of the microphone unit. The initial bias set value can be selected either from values around the center, or from the highest values. This can be implemented by the sensitivity adjustment device outputting a setting signal corresponding to a predetermined bias voltage to the voltage supply device 1 as an initial value when the sensitivity adjustment operation is executed.

In step S2, the comparison circuit 22 of the sensitivity adjustment device 20 compares the output voltage of the microphone unit and the reference voltage value, which is held in the reference voltage unit 21, in advance. The comparison result of the output voltage and reference voltage (e.g. difference value between the reference voltage and the output voltage) is supplied to the control signal generation circuit 24 via the AD converter 23. Based on this comparison result, the control signal generation circuit 24 judges whether sensitivity adjustment of the condenser microphone 2 is necessary. The AD converter 23 is a circuit for quantizing an analog signal, and outputting a digital signal. For this, the AD converter outputs the same digital signal for the analog input within a predetermined range. By this setting of the AD converter, a tolerance range, where it is judged that sensitivity adjustment of the microphone unit is unnecessary, can be set for the reference voltage value by the setting of the AD converter. If it is judged that the output signal of the AD converter is in the tolerance range, where sensitivity adjustment is unnecessary, process proceeds to step S5.

In step S2, if sensitivity adjustment is necessary as a result of the judgment in the control signal generation circuit 24, the process proceeds to step S3.

In step S3, the control signal generation circuit 24 calculates the adjustment value of the bias voltage from the comparison result, which indicates the difference between the reference voltage and output of the microphone unit. For this calculation, a table, to refer to the adjustment value by a signal to indicate the difference between the reference voltage and output of the microphone unit, for example, may be provided in advance. According to the calculation result, a setting signal for the PWM duty control circuit is output.

If the voltage output from the microphone unit is lower than the reference voltage and if the sensitivity of the condenser microphone 2 must be increased, the bias voltage to be supplied to the condenser microphone must be set higher than the initial value. If the voltage output from the microphone unit is higher than the reference voltage, on the other hand, the voltage to be supplied to the condenser microphone must be set lower than the initial value. The control signal generation circuit can generate and output a new set value (digital value) for the PWM duty control circuit based on the digital signal indicating the comparison result.

In step S4, the PWM duty control circuit outputs a new PWM duty adjustment signal according to the setting signal from the control signal generation circuit 24. At this time, if the control signal is a signal for setting the bias voltage higher than the initial value, the PWM duty control circuit outputs a duty control signal for increasing the duty of the clock, which the PWM circuit outputs. If the control signal is a signal for setting the bias voltage lower than the initial value, then the PWM duty control circuit outputs a PWM duty control circuit for decreasing the duty of the clock, which the PWM circuit outputs. As a result, the duty of the clock to be output from the PWM circuit changes based on the new PWM duty control signal, which is output. Since the duty of the clock, which the PWM circuit outputs, changes, the bias voltage generated by the charge pump circuit changes.

Then the processing returns to step S1, and the output voltage of the microphone unit is detected again. The voltage which the charge pump circuit outputs at this time is the adjusted voltage based on step S4. Therefore the bias voltage applied to the condenser microphone also changes, and the sensitivity of the microphone unit also changes. Hereafter the operations in S1-S4 are repeated, and the process proceeds to step S5 when it is judged that sensitivity adjustment is unnecessary in step S2.

In step S5, the control signal generation circuit 24 generates a write specification signal for the storage circuit, and a set value signal to be stored in the storage signal. This write setting signal and set value signal are input from the terminal for sensitivity adjustment 9. According to the write setting signal from the sensitivity adjustment device, the set value, when it was judged that the sensitivity adjustment is unnecessary, is stored in the storage circuit. Here the set value to be stored in the storage unit is a digital signal for indicating the setting for the PWM duty control circuit. Therefore this set value can be stored in an EEPROM or by a fuse.

Now the normal operation of the voltage supply circuit and microphone unit, of which sensitivity was adjusted in this way, will be described. In normal operation, the voltage supply circuit 1 can be used in a state separate from the sensitivity adjustment device. Therefore in normal operation, a signal corresponding to the set value is not supplied to the PWM duty control circuit via the terminal for sensitivity adjustment 9 and the serial-parallel conversion circuit. In normal operation, the set value stored in the storage circuit 12 is supplied to the PWM duty control circuit. This operation is performed, for example, by referring to an adjustment completion flag, which is stored in the storage circuit 12, when the circuit is activated. For example, when the adjustment completion flag has been stored in the storage circuit, the output of the serial-parallel conversion circuit is not connected to the PWM duty adjustment circuit, and the output from the storage circuit is connected thereto. By this configuration, a PWM duty control signal can be generated based on the set value stored in the storage circuit during normal operation. Since the bias voltage is generated based on the PWM duty control signal, the bias voltage, after the sensitivity adjustment, is generated and supplied to the condenser microphone 2 in normal operation.

In the normal operation, the terminal for sensitivity adjustment and the serial-parallel conversion circuit are paused, so signals are not transmitted/received with other circuits. The set value read from the storage circuit 12 may be held during operation by latching in the PWM duty control circuit.

As described above, the voltage supply circuit 1 installed in the microphone unit of the first embodiment can generate a bias voltage according to the manufacturing dispersion, which each element constituting the microphone unit may have.

Figure 7:
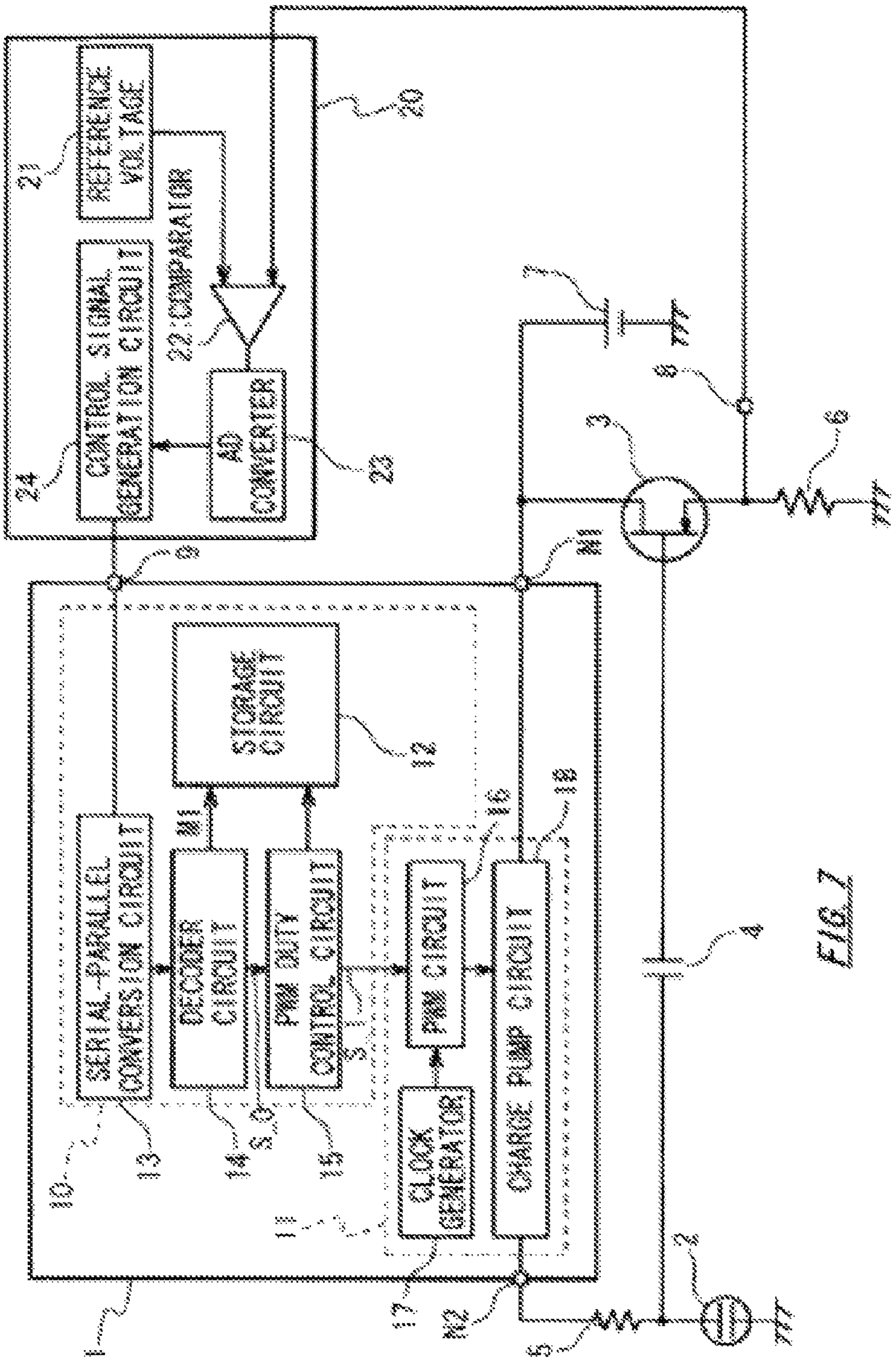
FIG. 7 is a block diagram depicting another example of the first embodiment.

FIG. 7 is a block diagram depicting another example of the first embodiment. In the circuit configuration and the sensitivity adjustment operation in FIG. 3, the control signal generation circuit in the sensitivity adjustment circuit outputs the set signal and the write control signal for the PWM duty adjustment circuit, but in this example the configuration is different. This other example of the first embodiment will now be described focusing primarily on the difference from the circuit in FIG. 3.

The voltage supply circuit 1 shown in FIG. 7 has a decoder circuit 14 inside the voltage control circuit 10. The decoder circuit 14 is a circuit for performing write control for the storage circuit 12 and operation control for the PWM duty control circuit 15 based on the digital signal which is output from the serial-parallel conversion circuit 13.

The PWM duty control circuit 15 shown in FIG. 7 stores digital codes internally. A plurality of codes are stored according to the type of the PWM duty control signal to be output. The plurality of codes have respective code numbers.

In the sensitivity adjustment device 20 shown in FIG. 7, the control signal which the control signal generation circuit 24 outputs is a command signal for instructing the operation of the decoder circuit 14 of the voltage supply circuit 1.

Figure 8:
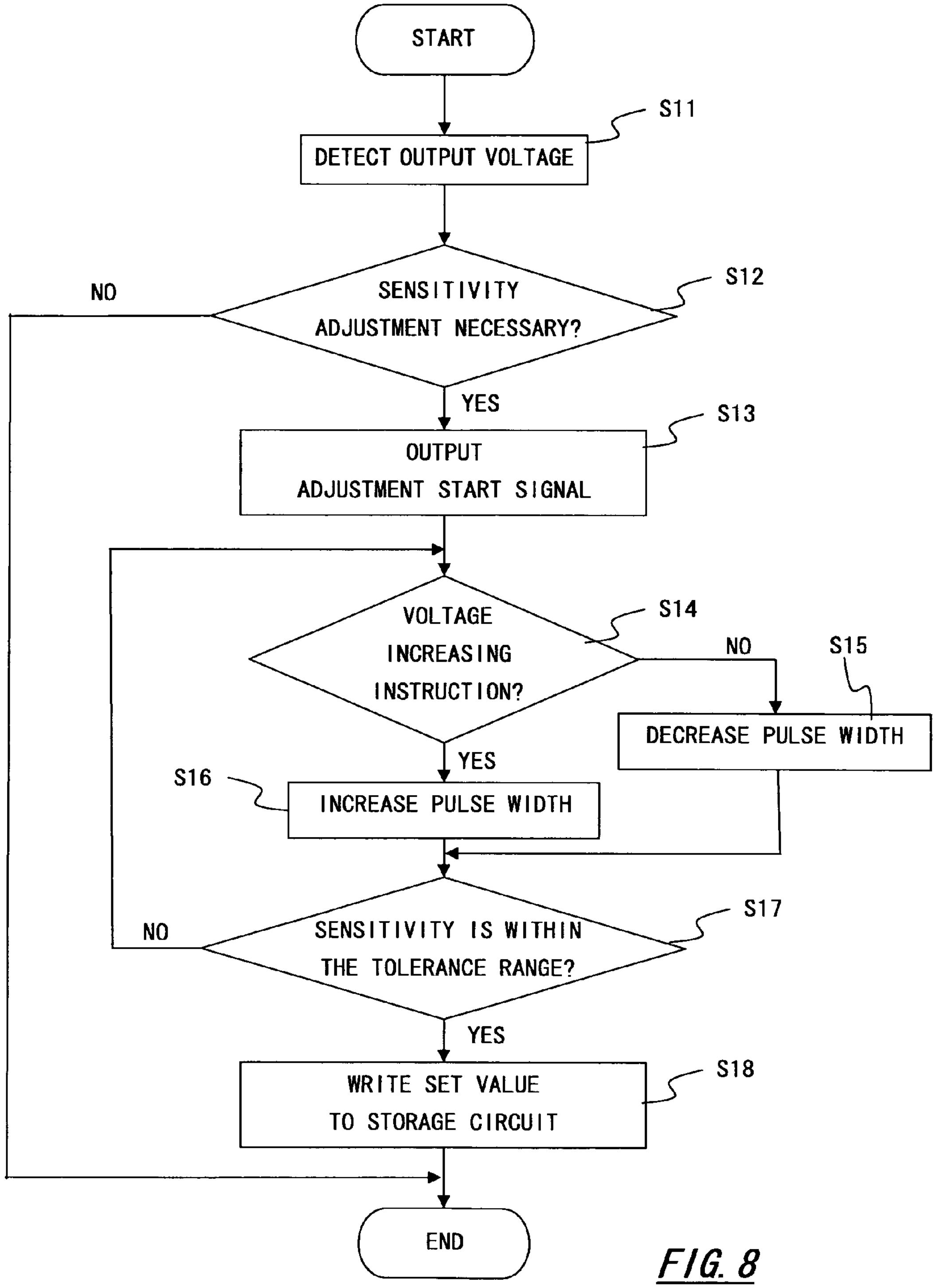
FIG. 8 is a flow chart depicting the sensitivity adjustment operation using another example of the first embodiment.

FIG. 8 is a flow chart depicting the sensitivity adjustment operation using another example of the first embodiment. The sensitivity adjustment operation of the voltage supply circuit based on FIG. 8 will now be described. In the sensitivity adjustment operation, the sensitivity adjustment device 20 is connected to the microphone unit. In normal operation, the voltage supply circuit 1 can be used in a state separate from the sensitivity adjustment device.

In step S11 in FIG. 8, the sensitivity adjustment device 20 detects the output voltage which is output from the microphone unit.

In step S12, the comparison circuit 22 compares the output voltage of the microphone unit and the reference voltage value. The comparison result is supplied to the control signal generation circuit 24 via the AD conversion circuit 23. Based on this comparison result, the control signal generation circuit 24 judges whether sensitivity adjustment is necessary. If sensitivity adjustment is unnecessary, the process proceeds to step S18.

If sensitivity adjustment is necessary as the result of step S12, the process proceeds to step S13. In step S13, the control signal generation circuit 24 generates the adjustment start signal for notifying the start of the sensitivity adjustment to the voltage supply circuit 1, and outputs it to the voltage supply circuit 1.

If the bias voltage to be applied to the condenser microphone 2 need be boosted, the control signal generation circuit 24 generates the adjustment start signal including an instruction to boost the output voltage of the charge pump circuit 18 (hereafter called the voltage increasing instruction). If the bias voltage to be applied to the condenser microphone 2 need be dropped, the control signal generation circuit 24 generates the adjustment start signal including the instruction to drop the output voltage of the charge pump circuit 18 (hereafter called the voltage dropping instruction).

The adjustment start signal to be output from the sensitivity adjustment device 20 is supplied to the decoder circuit 14 via the terminal for sensitivity adjustment 9 in FIG. 7. In step S14, the decoder circuit 14, which received the adjustment start signal, refers to the adjustment start signal and confirms whether the included instruction is a voltage increasing instruction or a voltage dropping instruction. If the voltage dropping instruction is included as a result of this configuration, the process proceeds to step S15. If the voltage increasing instruction is included, the process proceeds to step S16.

In step S15, the decoder circuit 14 generates the sensitivity adjustment signal S_0 responding to the instruction (voltage dropping instruction) included in the adjustment start signal, and supplies it to the PWM duty control circuit 15. Responding to the sensitivity adjustment signal S_0, which is a voltage dropping instruction, the PWM duty control circuit 15 drops the rank of the code for determining the switch pulse width of the charge pump down one. This code number is maintained. In the present embodiment, it is assumed that the switching pulse width decreases as the value of the code number decreases. In other words, as the code number decreases, the output voltage decreases in the setting. The PWM duty control circuit 15 generates the bias voltage control signal S_1 corresponding to the one rank lowered code number, and supplies it to the PWM circuit 16.

In step S16, the decoder circuit 14 in FIG. 7 generates the sensitivity adjustment signal S_0 responding to the instruction (voltage increasing instruction) included in the adjustment start signal, and supplies it to the PWM duty control circuit 15. Responding to the sensitivity adjustment signal S_0, which is a voltage increasing instruction, the PWM duty control circuit 15 increases the rank of the code number one up. And this code number is maintained. The PWM duty control circuit 15 generates the bias voltage control signal S_1 corresponding to the one rank raised code number, and supplies it to the PWM circuit 16. The charge pump circuit 18 generates the bias voltage corresponding to the clock pulse supplied from the PWM circuit 16, which is the same as the above mentioned sensitivity adjustment operation.

In step S17, the sensitivity adjustment device 20 judges whether the sensitivity is within the tolerance range. If the predetermined sensitivity is not satisfied as a result of the judgment, the processing returns to execute the boosting (or dropping) of the bias voltage. If the predetermined sensitivity is satisfied, the process proceeds to step S18.

In step S18, based on the judgment that the condenser microphone 2 satisfies the specified sensitivity, the control signal generation circuit 24 generates the instruction for holding the bias voltage, that is the set value holding instruction (write instruction), and outputs it to the decoder circuit 14. Responding to the write instruction to be supplied via the control signal input terminal 9, the decoder circuit 14 outputs the signal for storing the information corresponding to the current bias voltage to the storage device 12 as a set value (signal M1 in FIG. 7). Responding to this signal M1, the storage device 12 receives the information corresponding to the current bias voltage held by the PWM duty control circuit 15, that is the code number, from the PWM duty control circuit 15, and writes it as a set value. In this configuration as well, normal operation is the same as the circuit in FIG. 3, so description thereof will be omitted.

Figure 9:
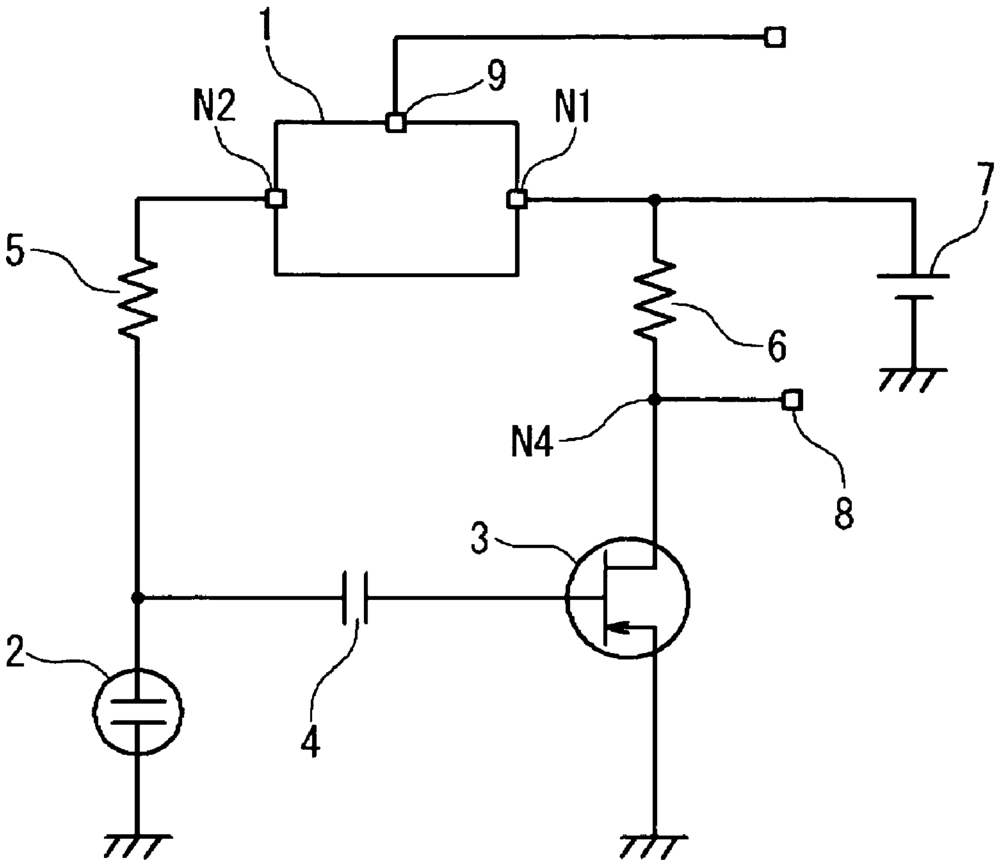
FIG. 9 is a block diagram depicting another configuration of the microphone unit in the portable device of the first embodiment.

The microphone unit of the first embodiment has a configuration of outputting the signal amplified by the amplification circuit 3 from the third node N3, but this does not limit the output terminal of the present invention. FIG. 9 is a block diagram depicting another configuration of the microphone unit in the portable device of the first embodiment. As FIG. 9 shows, the microphone unit includes the output terminal 8 connected to the fourth node N4 in the configuration. In this way, the microphone unit may have a configuration such that the output voltage output from the condenser microphone 2 is output to the output terminal 8 via the fourth node N4.

Second Embodiment

Figure 10:
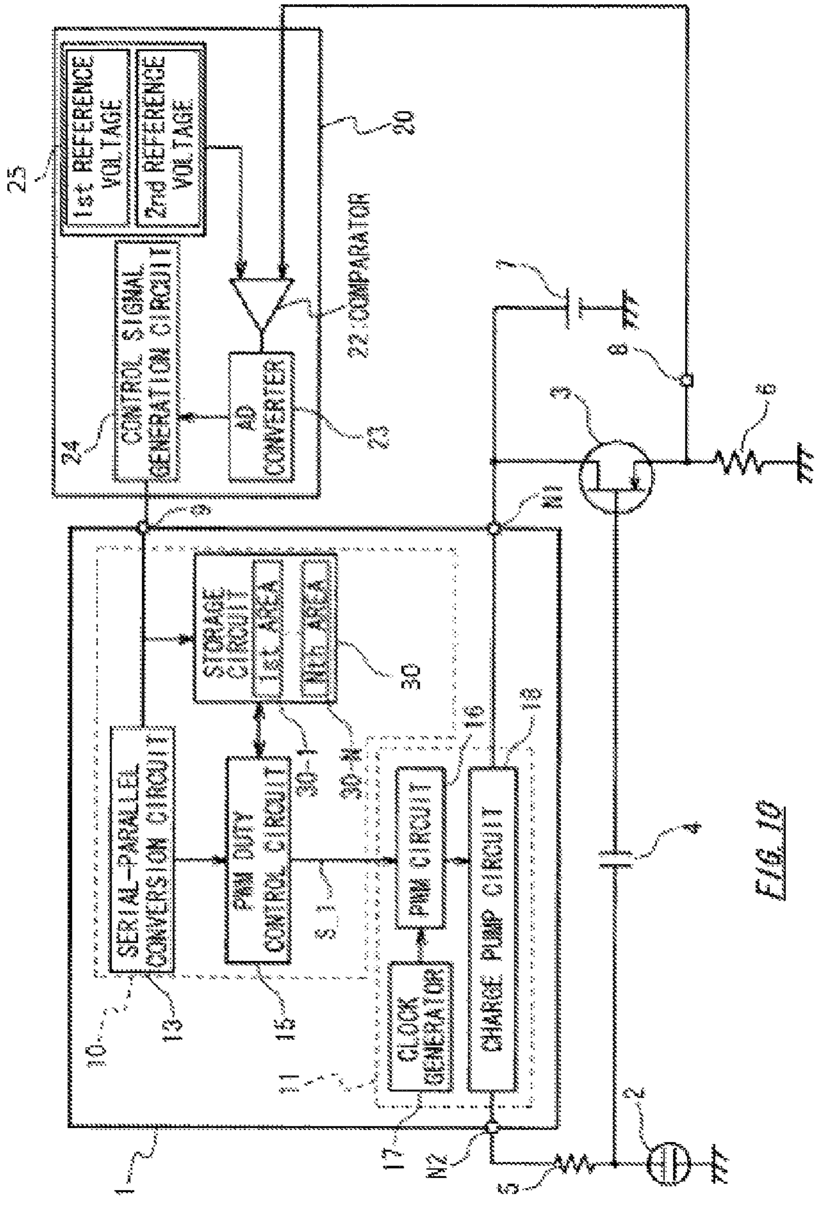
FIG. 10 is a block diagram depicting a second embodiment of the present invention.

FIG. 10 is a block diagram depicting a second embodiment of the present invention. In the microphone unit according to the second embodiment, the storage circuit is different from the first embodiment. The storage unit 30 of the second embodiment comprises a plurality of storage areas, the first storage area 30-1-Nth storage area 30-N (N: 2 or higher natural number). Each of the plurality of storage areas stores the set value corresponding to a different sensitivity.

FIG. 10 is a block diagram depicting the configuration in the sensitivity adjustment according to the second embodiment of the present invention. In the sensitivity adjustment device 20 according to the second embodiment, the reference voltage block 25 is different from the first embodiment. The reference voltage block 25 stores a plurality of reference voltage values. The reference voltage block 25 in FIG. 10 comprises two reference voltages to simplify understanding of the present embodiment, but this does not limit the configuration of the reference voltage block 25 in the present invention.

Figure 11:
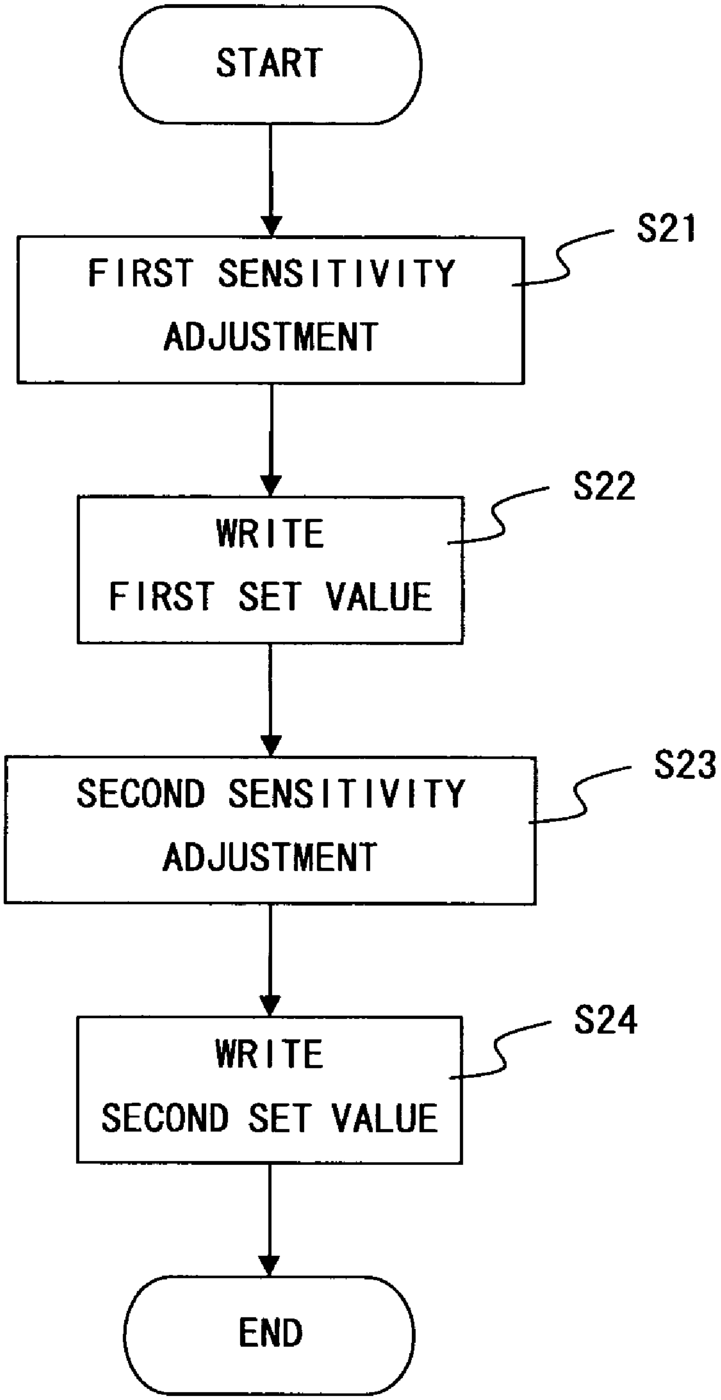
FIG. 11 is a flow chart depicting the sensitivity adjustment operation of the second embodiment.

FIG. 11 is a flow chart depicting the sensitivity adjustment operation of the second embodiment. In the description below, the device where the microphone unit can switch two sensitivities, the first and the second sensitivity, is used as an example.

In step S21, the sensitivity adjustment operation corresponding to the first sensitivity is performed. This sensitivity adjustment operation is basically the same as the first embodiment shown in FIG. 6. In the second embodiment, however, when the first sensitivity adjustment operation is performed, the first reference voltage in the reference voltage block and the output voltage of the microphone unit are compared in the sensitivity adjustment circuit 20. Here it is assumed that the first reference voltage stored in the reference voltage block corresponds to the first sensitivity.

In step S22, the first set value based on the first reference voltage is determined. This set value is stored in the first area of the storage device 30 of the voltage supply circuit 1 as the set value for the first sensitivity. In the second embodiment, the process proceeds to the next step, S23, to determine the set value corresponding to the second sensitivity.

In step S23, the sensitivity adjustment operation corresponding to the second sensitivity is performed. This sensitivity adjustment operation is basically the same as the first embodiment shown in FIG. 6. In step S23, the second reference voltage in the reference voltage block and the output voltage of the microphone unit are compared when the second sensitivity adjustment operation is performed. Here it is assumed that the second reference voltage stored in the reference voltage block corresponds to the second sensitivity.

In step S24, the second set value based on the second reference voltage is determined. This set value is stored in the second area of the storage circuit 30 as the set value corresponding to the second sensitivity.

In this way, in the sensitivity adjustment operation of the second embodiment, the first set value based on the first reference voltage and the second set value based on the second reference voltage are determined respectively. The first and second set values are stored in a different area of the storage circuit 30 respectively.

As described above, the voltage supply circuit 1 installed in the microphone unit of the second embodiment has a storage circuit 30. The voltage supply circuit 1 can store the set values corresponding to the different sensitivities in a plurality of storage areas of the storage circuit 30. By this, even if each element constituting the microphone unit has manufacturing dispersion, the voltage supply circuit 1 can generate a bias voltage corresponding to the manufacturing dispersion. Also even if performance supporting a plurality of sensitivities is required for the device in which the microphone unit is installed, the plurality of sensitivities can be supported by one condenser microphone 2.

Now operation of the microphone unit storing the set values corresponding to the first sensitivity and the second sensitivity will be described. The microphone unit in the second embodiment starts operation responding to the device (e.g. portable terminal), in which the microphone unit is installed, being driven. In the following description, the case when the microphone unit of the present embodiment is a device which operates switching the first sensitivity (low sensitivity) and the second sensitivity (high sensitivity) will be used as an example. The number of sensitivities described here is two, but this is merely to simplify understanding of the present invention, and does not limit the number of sensitivities which the microphone unit of the present invention can switch. The sensitivity switching signal for switching the sensitivity can be input from the terminal for sensitivity adjustment 9 to the voltage supply circuit.

In the microphone unit of the second embodiment, the sensitivity is initially set either to the first set value or the second set value immediately after operation starts. In other words, when operation starts, a predetermined area of the storage circuit 30 is specified, and the storage content thereof is output to the PWM duty control circuit. Immediately after operation starts, the bias voltage control signal, according to the set value of the initial setting, is supplied to the voltage generation circuit 10. The voltage generation circuit 11 applies the predetermined bias voltage to the condenser microphone.

When the sensitivity switching signal is input to the terminal for sensitivity adjustment 9, a different area of the storage circuit, depending on the sensitivity switching signal, is specified. When the read area of the storage circuit is changed based on the sensitivity switching signal, the set value to be read to the PWM duty control circuit 15 is also changed. Since the set value to the PWM duty control circuit 15 changes, the bias voltage control signal also changes. According to the change of the bias voltage control signal, the voltage generation circuit generates the second bias voltage which corresponds to the second sensitivity, and applies this to the condenser microphone 2. By this, a device that can support a plurality of sensitivities can be constructed without providing a plurality of microphone units.

In the second embodiment as well, the decoder circuit 14 can be installed in the voltage supply circuit, just like the first embodiment shown in FIG. 7. The voltage supply circuit 1 shown in FIG. 7 can have a storage circuit which has a plurality of storage areas. The sensitivity adjustment device 20 shown in FIG. 7 can hold a plurality of reference voltage. In this case, when the sensitivity adjustment operation is performed, the sensitivity adjustment operation shown in FIG. 8 is repeated. The second set value is determined after the first set value is determined, which is the same as FIG. 11, so details are omitted here.

Figure 12:
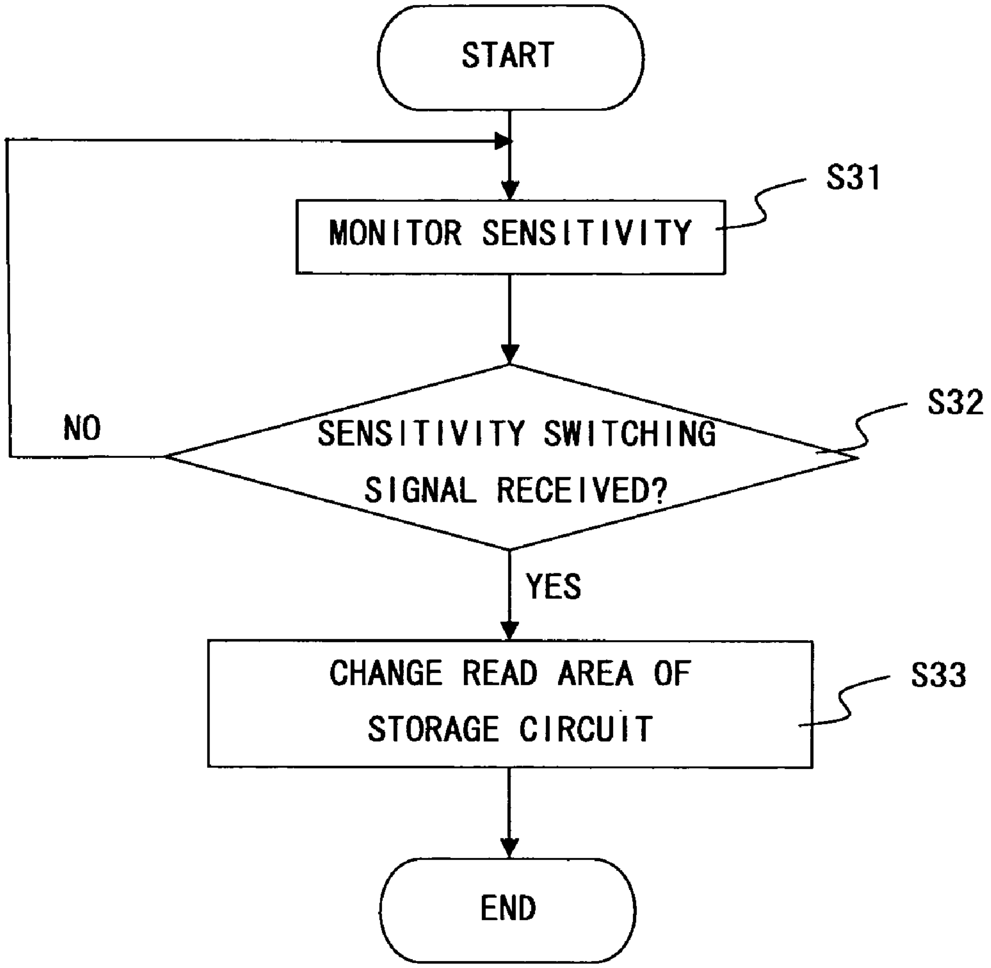
FIG. 12 is a flow chart depicting the normal operation when a decoder circuit is installed in the voltage supply circuit.

FIG. 12 is a flow chart depicting the normal operation when a decoder circuit is installed in the voltage supply circuit. In step S31 in FIG. 12, the decoder circuit monitors with the sensitivity, out of the plurality of sensitivities, that has driven the microphone unit. Immediately after the start, a predetermined bias voltage based on the initial setting is applied, which is the same as the above description. In step S32, the decoder circuit judges whether the sensitivity switching signal, which is input via the terminal for sensitivity adjustment 9, has been received. If the sensitivity switching signal has not been received as a result of the judgment, the processing returns to the start, and continues monitoring the sensitivity. If the sensitivity switching signal has been received, the process proceeds to step S33.

In step S33, the decoder circuit 14 outputs a read instruction to change the read area of the storage device 30 to generate the bias voltage corresponding to the received sensitivity switching signal. The PWM duty control circuit 15 generates the PWM duty control circuit S_1 based on the set value stored in the second storage area, and outputs it to the PWM circuit 16. The charge pump circuit generates the bias voltage based on the output of the PWM circuit.

If the decoder circuit is used, an address specification signal for the storage circuit 30, for example, may be used for the switching signal. In other words, the set value may be read from the storage circuit to the PWM duty control circuit by an address specification signal being input from the terminal for the sensitivity adjustment 9 and by the decode circuit selecting the area corresponding to that address.

Third Embodiment

Figure 13:
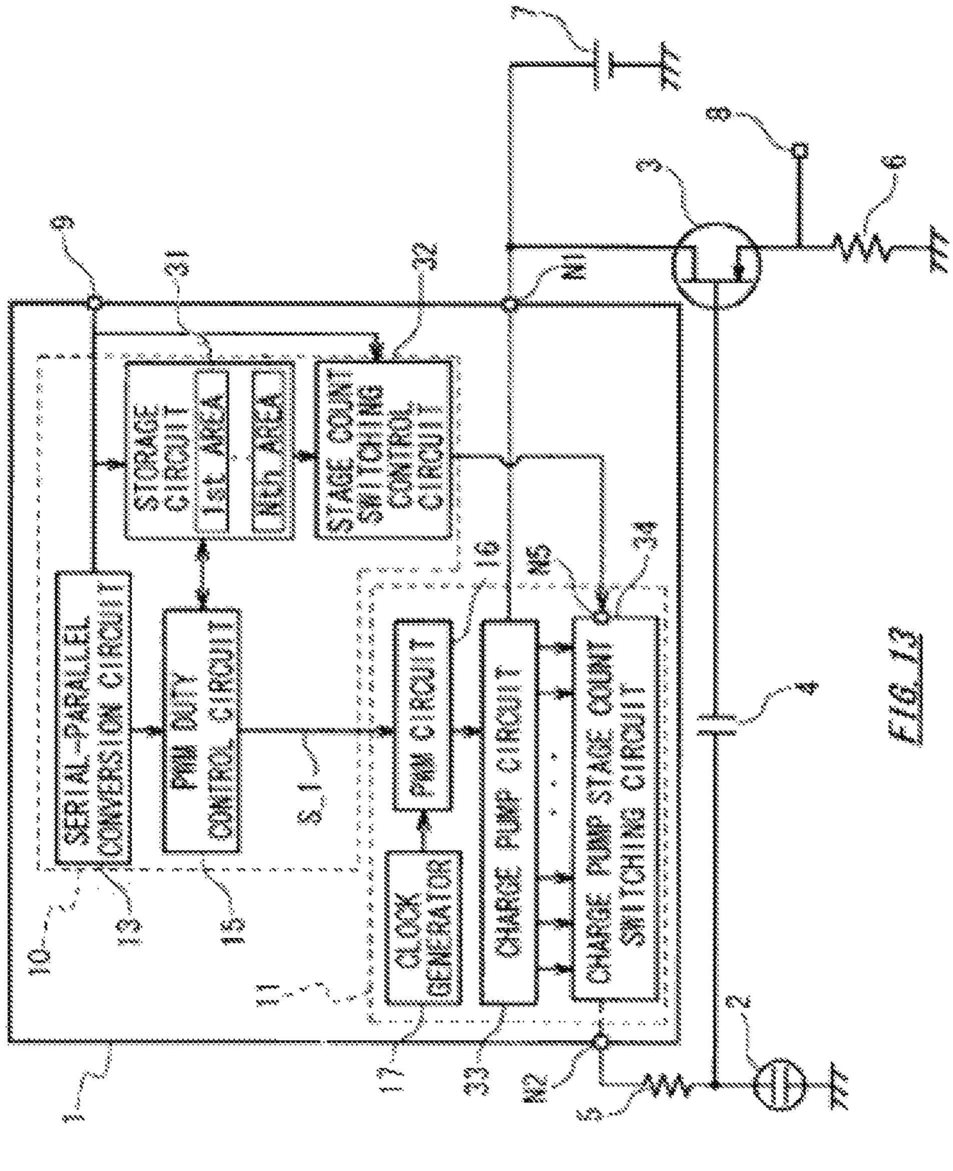
FIG. 13 is a block diagram depicting the third embodiment of the present invention.

FIG. 13 is a block diagram depicting the third embodiment of the present invention. The voltage generation circuit 11 according to the third embodiment includes the charge pump stage count switching circuit 34 in the post-stage of the charge pump circuit 33. The voltage control circuit 10 of the third embodiment comprises a storage device 31 and the stage count switching control circuit 32 for controlling the storage device 31 and the charge pump stage count switching circuit 34.

The charge pump circuit 33 shown in FIG. 13 is a charge pump circuit comprising a plurality of output terminals. The plurality of output terminals of the charge pump circuit 33 are connected to the charge pump stage count switching circuit 34.

The stage count switching control circuit 32 installed in the voltage control circuit 10 of the third embodiment is a control circuit for instructing the charge pump stage count switching circuit 34 to switch the number of stages of the charge pump circuit 33 according to the control signal to be input via the terminal for sensitivity adjustment 9.

Figure 14:
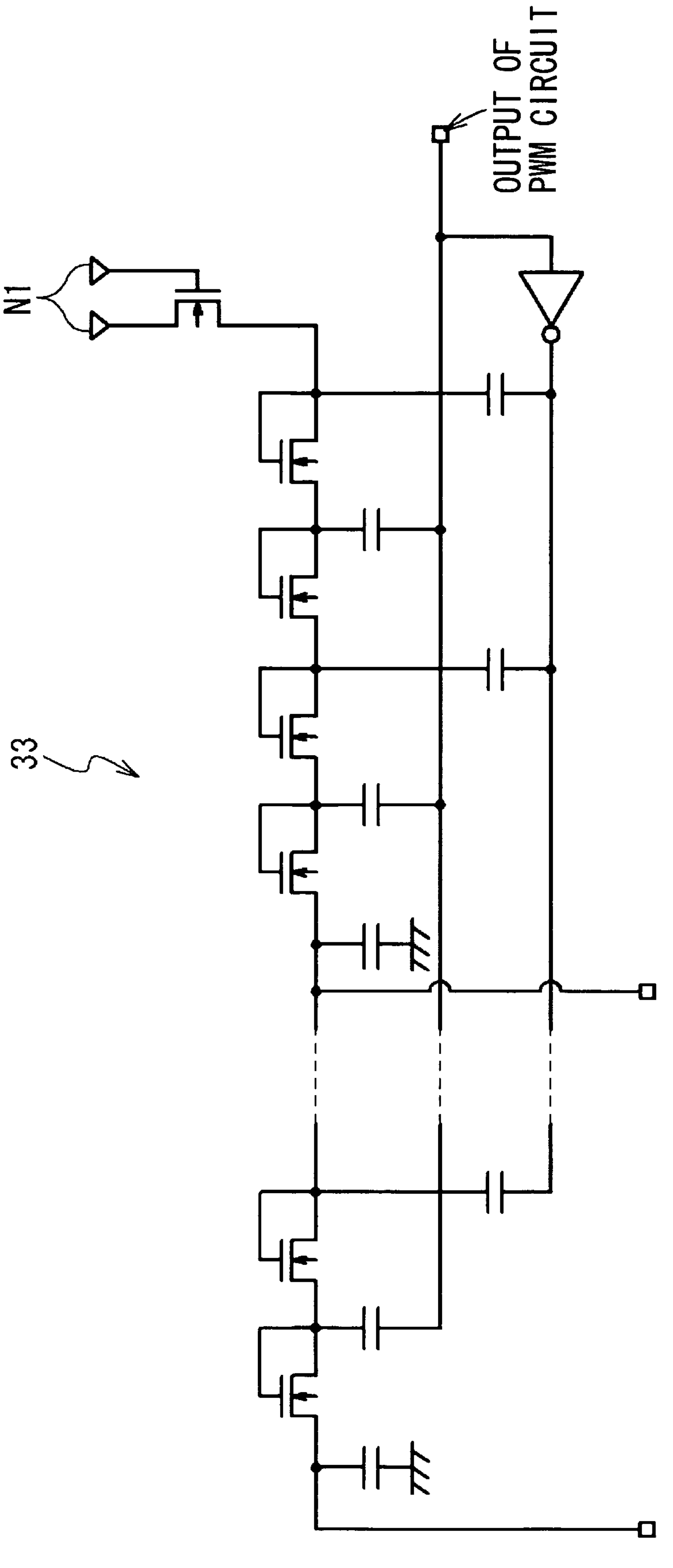
FIG. 14 is a circuit diagram depicting the configuration example of the charge pump circuit 33 according to the third embodiment.

FIG. 14 is a circuit diagram depicting the configuration example of the charge pump circuit 33 according to the third embodiment. As FIG. 14 shows, the multi-stage charge pump power supply circuit 33 according to the third embodiment comprises a plurality of output terminals. In FIG. 14, the multi-stage charge pump power supply circuit 33 comprising two output terminals is shown as an example merely to simplify understanding of the present invention, but this does not limit the number of output terminals of the charge pump circuit 33 of the present invention.

The plurality of output terminals of the charge pump circuit 33 are constructed so that voltages corresponding to an arbitrary number of stages, other than the final stage, are output.

Figure 15:
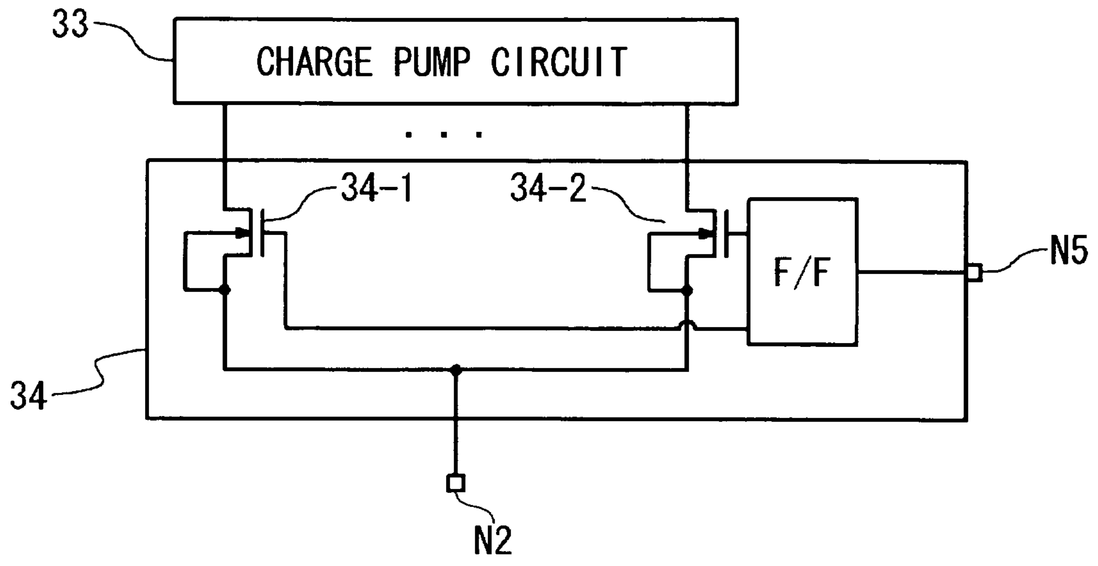
FIG. 15 is a circuit diagram depicting the configuration of the charge pump stage count switching circuit 34 to be connected to the charge pump circuit 33 according to the third embodiment.

FIG. 15 is a circuit diagram depicting the configuration of the charge pump stage count switching circuit 34 to be connected to the charge pump circuit 33 according to the third embodiment. As FIG. 15 shows, the charge pump stage count switching circuit 34 comprises a flip-flop circuit which is connected to the stage count switching control circuit 32, and transistors (34-1, 34-2) for controlling the output stage of the charge pump circuit 33. The node N5 shown in FIG. 15 is connected to the stage count switching control circuit 32. The charge pump stage count switching circuit 34 shown in FIG. 15 is constructed corresponding to the above mentioned (shown in FIG. 14) charge pump circuit 33. Therefore the charge pump stage count switching circuit 34 executes the operation for switching two sensitivities according to the stage count switching instruction to be input via the fifth node N5. If three or more types of sensitivities are switched here, the charge pump stage count switching circuit 34 shown in FIG. 15 is changed to a configuration comprising a multiplexer circuit, and three or more types of output stage counts can be selectively switched.

Figure 16:
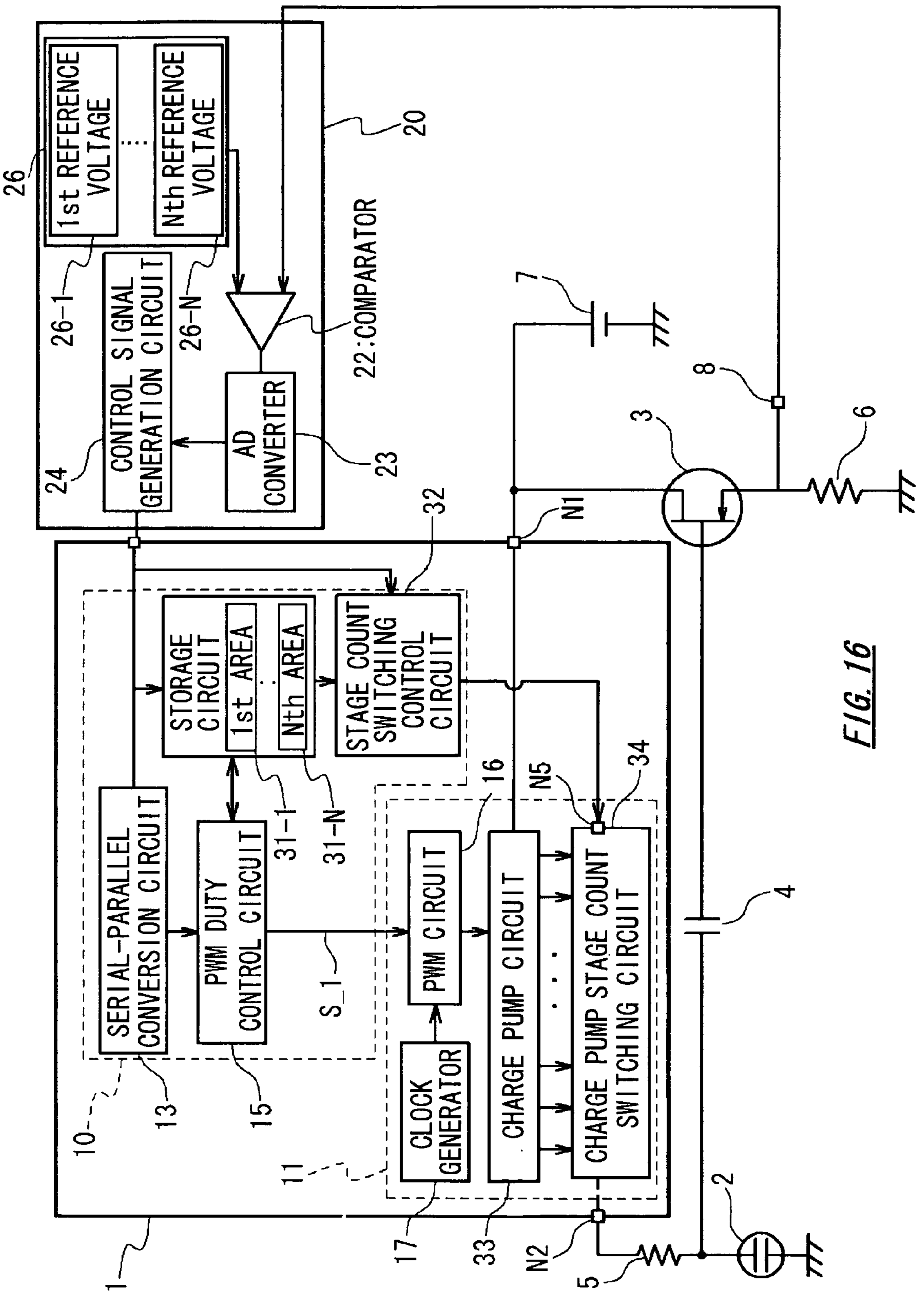
FIG. 16 is a block diagram depicting the configuration of the sensitivity adjustment according to the third embodiment.

FIG. 16 is a block diagram depicting the configuration of the sensitivity adjustment according to the third embodiment. As FIG. 16 shows, the sensitivity adjustment device 20 of the third embodiment comprises a reference input holding block 26 which is connected to the comparison circuit 22. This reference input holding block 26 further comprises a plurality of reference voltage storage areas (26-1-26-N) and stores the reference voltage in each area. The reference voltage block 26 shown in FIG. 16 comprises a connection terminal for receiving the reference voltage switching instruction. Responding to the instruction which is input from the connection terminal, the reference voltage block 26 can selectively change the reference voltage to an arbitrary target reference voltage.

Figure 17:
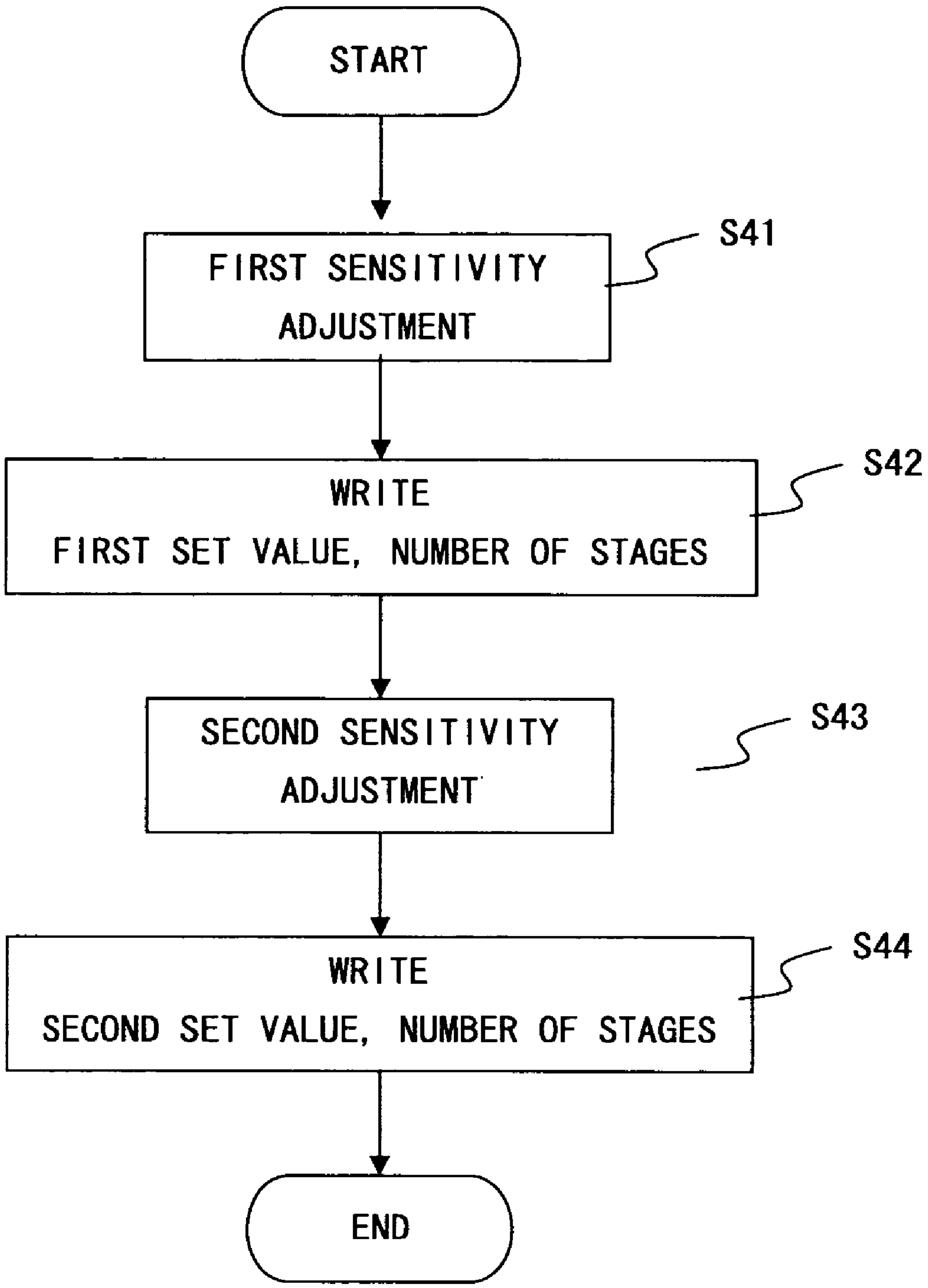
FIG. 17 is a flowchart depicting the sensitivity adjustment operation of the third embodiment.

FIG. 17 is a flow chart depicting the sensitivity adjustment operation of the third embodiment. The sensitivity adjustment operation of the microphone unit of the third embodiment will be described. In FIG. 17, just like the second embodiment, the sensitivity adjustment operation for two sensitivities, the first sensitivity and the second sensitivity, will be described.

In step S41, the sensitivity adjustment operation corresponding to the first sensitivity is performed. This sensitivity adjustment operation is basically the same as the second embodiment. In the third embodiment, the set signal for the PWM duty control circuit and the signal to specify the number of stages of the charge pump to the stage count switching control circuit are input from the terminal for sensitivity adjustment 9. This signal for specifying the number of stages can be implemented by referring to the higher 1 bit of the setting signal for the PWM duty control circuit, for example. The number of bits of the higher bits to be referred to can be arbitrarily changed according to the setting of the stage count switching. According to the stage count specification signal which is input from the terminal for sensitivity adjustment 9, the stage count switching control circuit outputs the stage count switching signal to the charge pump stage count switching circuit.

When the first sensitivity adjustment operation is performed, the first reference voltage in the reference voltage block and the output voltage of the microphone unit are compared in the sensitivity adjustment circuit 20. Here it is assumed that the first reference voltage stored in the reference voltage block corresponds to the first sensitivity. In the third embodiment, the number of stages of the charge pump must be set, so it is preferable that the initial value of the sensitivity adjustment is started from sensitivity zero or the maximum.

In step S42, the number of stages of the charge pump is set so that the output voltage becomes closest to the first reference voltage. After determining the number of stages of the charge pump, the first set value for the PWM control circuit is determined according to the number of stages. This number of stages and the set value are stored in the first area of the storage device 30 of the voltage supply circuit 1 as the number of stages and the set value corresponding to the first sensitivity. In the third embodiment, the process proceeds to the next step, S43, to determine the set value corresponding to the second sensitivity.

In step S43, the sensitivity adjustment operation corresponding to the second sensitivity is performed. In this sensitivity adjustment operation, the number of stages of the charge pump and the set value for the PWM duty control circuit are determined, just like the above mentioned first sensitivity adjustment operation. In step S33, the second reference voltage in the reference voltage block and the output voltage of the microphone unit are compared when the second sensitivity adjustment operation is performed. Here it is assumed that the second reference voltage stored by the reference voltage block corresponds to the second sensitivity.

In step S44, the number of stages of the charge pump based on the second reference voltage and the second set value are determined. This number of stages and the set value are stored in the second area of the storage circuit 31 as the number of stages and the set value corresponding to the second sensitivity.

In the microphone unit of the third embodiment, a predetermined area of the storage circuit 30 is specified when the operation is started, and the stored content thereof is output to the stage count switching setting circuit and the PWM duty control circuit. Therefore the number of stages of the charge pump and the PWM duty control signal based on the initial values are selected. After the operation starts, the bias voltage control signal according to the set value of the initial setting is supplied to the voltage generation circuit 10. The voltage generation circuit 11 applies the predetermined bias voltage to the condenser microphone.

When the sensitivity switching signal is input to the terminal for sensitivity adjustment 9, a different area of the storage circuit is specified based on the sensitivity switching signal. When the read area of the storage circuit is changed based on the sensitivity switching signal, the set values to be read to the stage count switching circuit and the PWM duty control circuit 15 are also changed. Since the set value to the PWM duty control circuit 15 changes, the bias voltage control signal also changes. According to the change of the bias voltage control signal, the voltage generation circuit generates the second bias voltage corresponding to the second sensitivity, and applies it to the condenser microphone 2. By this, a device supporting a plurality of sensitivities can be constructed without installing a plurality of microphone units.

In the present embodiment, not only the clock duty to be supplied to the charge pump but also the number of stages of the charge pump is also switched. Compared with the width of the bias voltage that can be changed by controlling the clock duty, the width of the change of voltage by changing the number of stages of the charge pump is extremely wide. Therefore according to the present embodiment, a much wider sensitivity adjustment becomes possible, and normal use with a highly accurate sensitivity can be implemented.

For the third embodiment as well, a configuration where a decoder circuit 14 is added can be used, just like the first and second embodiments. In this case, the above mentioned control operation can be controlled from the decoder circuit. A similar configuration shown in FIG. 7 can be used as a voltage supply circuit 1. The charge pump stage count switching circuit and the stage count switching control circuit can be added to the circuit shown in FIG. 7. The sensitivity adjustment operation shown in FIG. 8 is applied to the sensitivity adjustment operation shown in FIG. 17.

Figure 18:
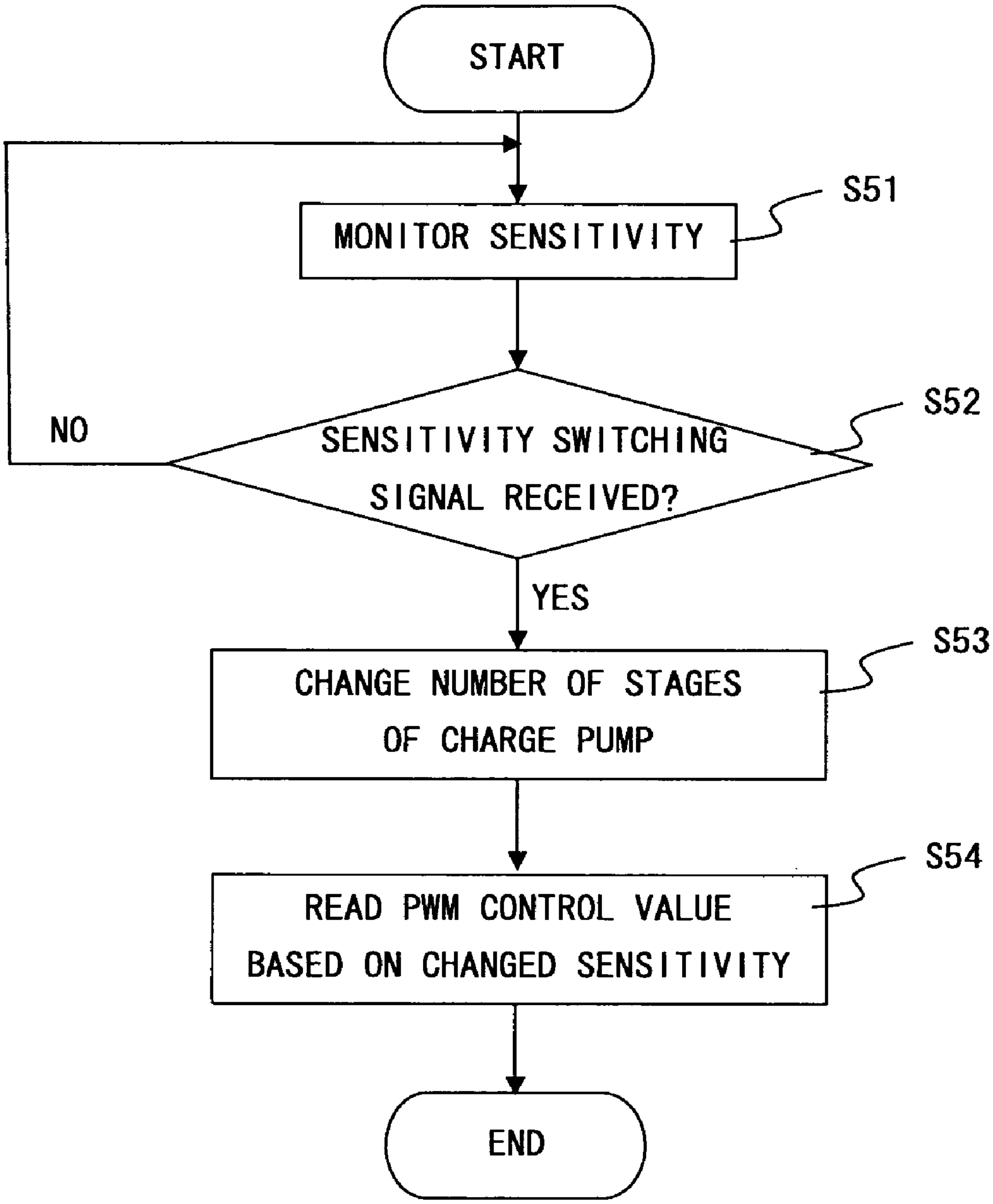
FIG. 18 is a flow chart depicting the operation of the microphone unit when the decoder circuit is added.

FIG. 18 is a flow chart depicting the operation of the microphone unit when the decoder circuit is added. In the operation immediately after start, the initial setting to select a certain set value is performed, just like the second embodiment.

In step S51 in FIG. 18, the decoder circuit 14 monitors which one of the plurality of sensitivities is driving the microphone unit. In step S52, the decoder circuit 14 judges whether the sensitivity switching signal, which is input via the terminal for sensitivity adjustment 9, has been received. If the sensitivity switching signal has not been received as a result of the judgment, the processing returns to the start to continue monitoring the sensitivity. If the sensitivity switching signal has been received, the process proceeds to step S53.

In step S53, the decoder circuit 14 outputs the sensitivity switching instruction so that the storage device 31 supplies the set value corresponding to the sensitivity after switching to the PWM duty control circuit 15. In step S54, the storage deice 31 supplies the set value corresponding to the sensitivity after switching to the PWM duty control circuit 15 based on the sensitivity switching instruction. At this time, the storage device 31 outputs the set value to the stage count switching control circuit 32. The PWM duty control circuit 15 generates the PWM duty control signal S_1 based on the signal, and outputs it to the PWM circuit 16. The PWM circuit 16 changes the pulse width of the clock pulse which is generated responding to the PWM duty control signal S_1, and supplies it to the charge pump circuit 33. At this time, the stage count switching control circuit 32 generates the stage count switching signal responding to the set value to be output, and supplies it to the charge pump stage count switching circuit 34. The voltage generation circuit 11 applies the bias voltage, which is generated by the multi-stage charge pump power supply circuit 33, based on the number of output stages of the charge pump determined by the charge pump stage count switching circuit 34, and the clock pulse width when this number of output stages is used, to the condenser microphone 2.

Fourth Embodiment

Figure 19:
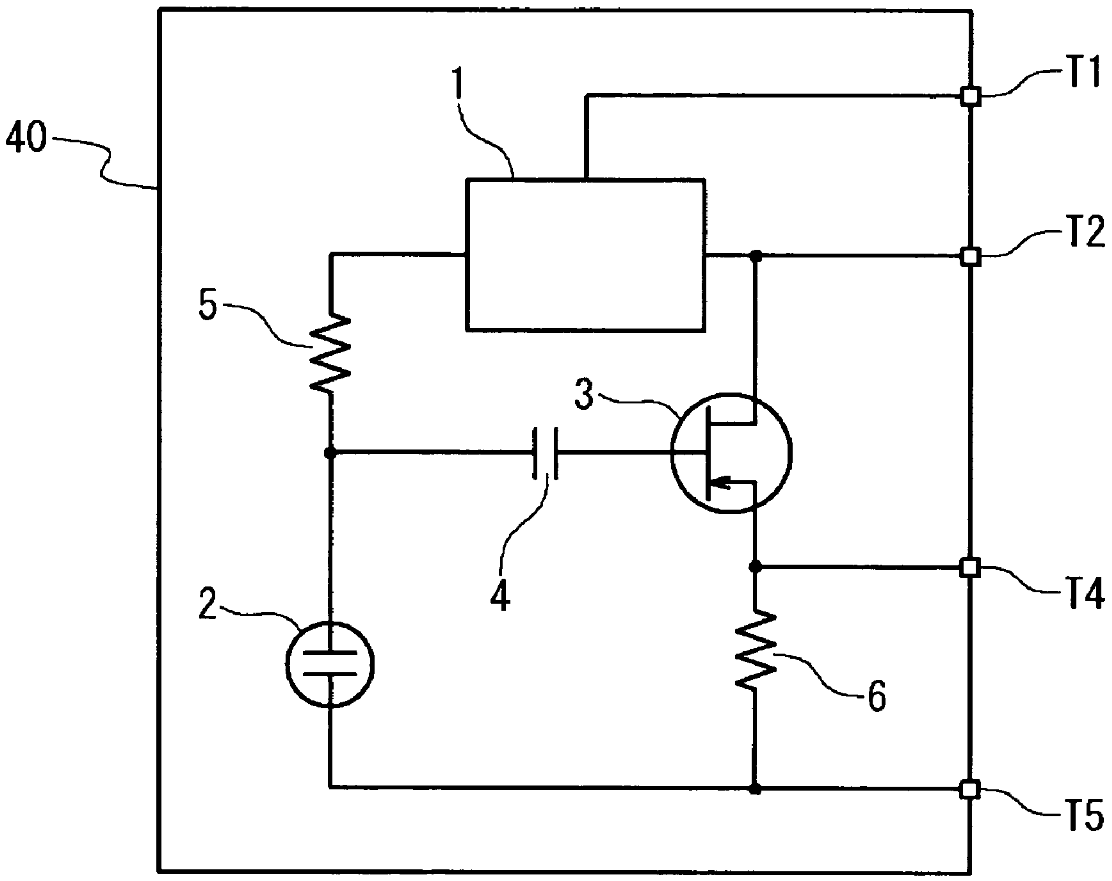
FIG. 19 is a block diagram depicting the configuration when the microphone unit of the present invention is created in an integrated type microphone device.

Now the fourth embodiment of the present invention will be described with reference to the drawings. FIG. 19 is a block diagram depicting the configuration when the microphone unit of the present invention is created in an integrated type microphone device. As FIG. 19 shows, when the microphone unit is created in an integrated type microphone device, the integrated type microphone device 40 comprises a plurality of terminals (T1, T2, T4, T5). The terminal T1 is a control signal input/output terminal connected to the control signal input terminal 9 (not illustrated) of the voltage supply circuit 1. The terminal T2 is a power supply terminal connected to the first node N1 (not illustrated) and the amplification circuit 3. The terminal T4 is an output terminal corresponding to the output terminal 8. The terminal T5 is a ground terminal. As FIG. 19 shows, the integrated type microphone device 40 includes the resistor 6 installed between the amplification circuit 3 and the terminal T5 in the configuration. The terminal T4 is connected to the node installed between the resister 6 and the amplification circuit 3. The integrated type microphone device 40 outputs the output voltage, responding to the voice signal which is input to the condenser microphone 2, from the terminal T4.

Figure 20:
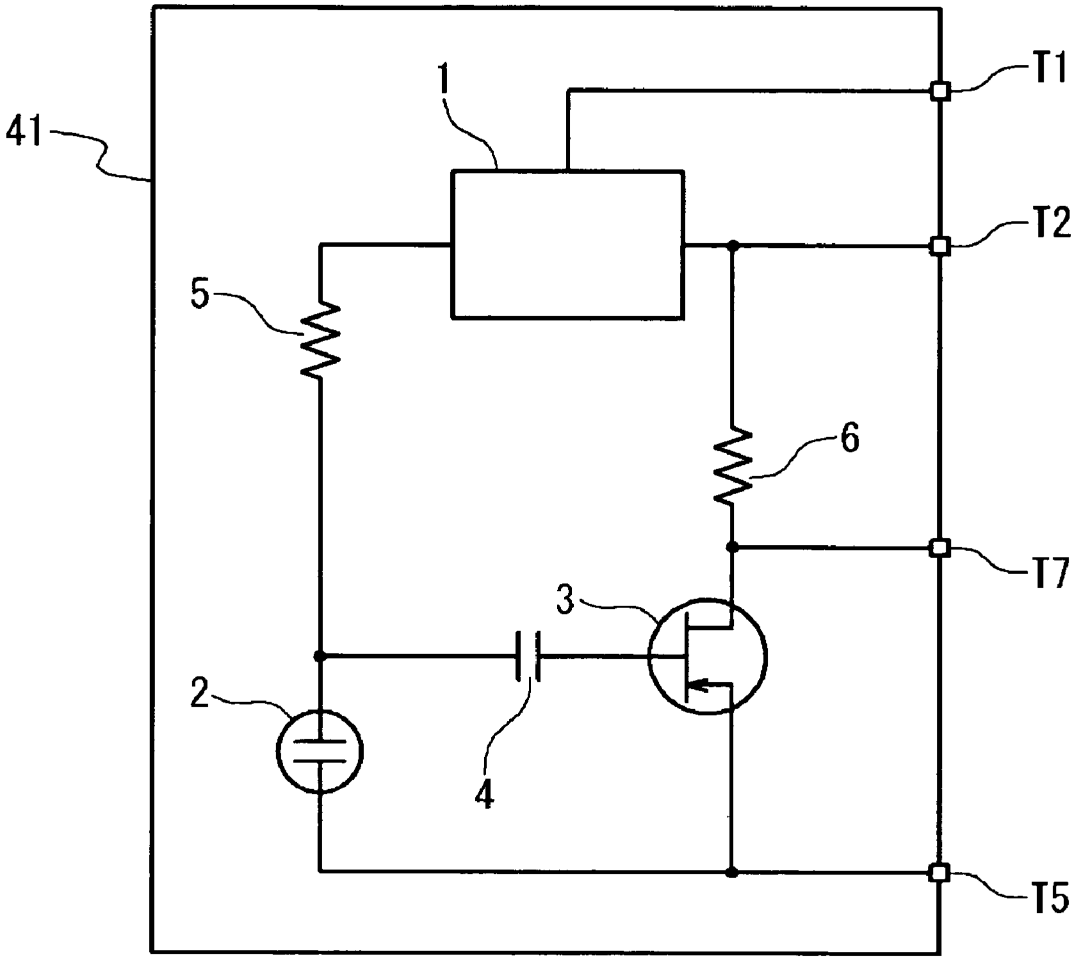
FIG. 20 is a block diagram depicting another configuration of the integrated type microphone device of the fourth embodiment.

FIG. 20 is a block diagram depicting another configuration of the integrated type microphone device of the fourth embodiment. The integrated type microphone device 41 shown in FIG. 20 has the terminal T7 in the configuration. The terminal T7 is an output terminal corresponding to the output terminal 8 of the circuit shown in FIG. 8. Other terminals T1, T2 and T5 are the same as the microphone device shown in FIG. 19. As FIG. 20 shows, the integrated type microphone device 41 has a resistor 6 installed between the amplification circuit 3 and the terminal T2 in the configuration. The terminal T7 is connected to the node installed between the resistor 6 and the amplification circuit 3. The integrated type microphone device 41 outputs the output voltage responding to the voice signal which is input to the condenser microphone 2 from the terminal T7.

By constructing the microphone unit using the integrated type microphone device comprising a plurality of terminals in this way, a general purpose microphone device can be created. The microphone unit of the present invention can execute appropriate sensitivity adjustment after manufacturing, so even if the microphone unit is applied to various equipment, it is unnecessary to change the design for each equipment, and a desired performance can be acquired.

In the above embodiments, the power supply circuit is used by increasing the voltage of the external power supply as an example, but in the present invention the voltage can be decreased if the external power supply has a higher voltage. In this case, the bias voltage under the conditions set by the storage circuit can be set using a voltage dropping circuit. The case when the external power supply is one power supply was described, but a two power supply system may be used by separating a power supply for applying a bias voltage to the sensor. This is possible regardless the method of receiving external output.

The power supply circuit of the present invention was described above using a sensor, particularly a vibration sensor (condenser microphone), as an example, but application of the power supply circuit of the present invention is not limited to the condenser microphone. For example, the present invention can be effectively used for another sound pressure sensor, using a semiconductor device, for example, for detecting the displacement of capacitance, which operates on the same principles as the condenser microphone. The present invention is also very effective for a displacement detection type vibration sensor, particularly a type for detecting the change of capacitance. Also the power supply circuit of the present invention can be applied to other sensors which can change the output by a DC bias voltage, such as a temperature sensor and a photo-sensor. The above described embodiments can be combined and implemented if the operation is not subject to conflict.

It is apparent that the present invention is not limited to the above embodiment and it may be modified and changed without departing from the scope and spirit of the invention.

What is claimed is:

1. A voltage supply circuit comprising:

a voltage control circuit which outputs a bias voltage control signal according to a set value based on a bias voltage applied to a sensor; and a voltage generation circuit which generates the bias voltage applied to the sensor based on the bias voltage control signal, wherein the voltage control circuit generates the bias voltage control signal based on a sensitivity adjustment signal supplied to a terminal for sensitivity adjustment of the voltage control circuit from a source external to the voltage control circuit.

2. The voltage supply circuit as claimed in claim 1, wherein the voltage control circuit comprises a storage circuit for holding the set value.

3. The voltage supply circuit as claimed in claim 2, wherein the storage circuit stores the set value responding to a set value holding signal input to the terminal for sensitivity adjustment of the voltage control circuit.

4. The voltage supply circuit as claimed in claim 3, wherein the storage circuit stores a plurality of set values, and the voltage control circuit selects an arbitrary set value out of the plurality of set values based on a sensitivity switching signal, and outputs a bias voltage control signal corresponding to the selected set value.

5. The voltage supply circuit as claimed in claim 2, wherein the storage circuit stores a plurality of set values, and the voltage control circuit selects a set value out of the plurality of set values based on a sensitivity switching signal, and outputs the bias voltage control signal corresponding to the selected set value.

6. The voltage supply circuit as claimed in claim 2, wherein the storage circuit stores a plurality of set values, and the voltage control circuit selects a set value out of the plurality of set values based on a sensitivity switching signal, and outputs a bias voltage control signal corresponding to the selected set value.

7. A voltage supply circuit comprising:

a voltage control circuit which outputs a bias voltage control signal according to a set value based on a bias voltage of a sensor; and a voltage generation circuit which generates the bias voltage to be applied to the sensor based on the bias voltage control signal, wherein the voltage generation circuit comprises a pulse width modulation (PWM) circuit which outputs a clock pulse based on the bias voltage control signal, and a charge pump circuit which generates the bias voltage based on the clock pulse output by the PWM circuit.

8. A voltage supply circuit comprising:

a voltage control circuit which outputs a bias voltage control signal according to a set value based on a bias voltage of a sensor; and a voltage generation circuit which generates the bias voltage to be applied to the sensor based on the bias voltage control signal, wherein the voltage control circuit comprises a storage circuit for holding the set value, and wherein the voltage generation circuit comprises a pulse width modulation (PWM) circuit which outputs a clock pulse based on the bias voltage control signal, and a charge pump circuit which generates the bias voltage based on the clock pulse output by the PWM circuit.

9. The voltage supply circuit as claimed in claim 8, wherein the voltage control circuit comprises a PWM duty control circuit which generates the bias voltage control signal based on a sensitivity adjustment signal input via a terminal for sensitivity adjustment of the voltage control circuit.

10. The voltage supply circuit as claimed in claim 8, wherein the voltage generation circuit further comprises a change pump stage count switching circuit for switching the number of boosting stages of the charge pump circuit.

11. A microphone unit, comprising:

a microphone to which bias voltage is supplied;

a voltage generation circuit which boosts a power supply voltage and generates the bias voltage based on a bias voltage control signal; and a voltage control circuit which outputs the bias voltage control signal based on a set value of the bias voltage, wherein the voltage control circuit generates the bias voltage control signal based on a sensitivity adjustment signal supplied to a terminal for sensitivity adjustment of the voltage control circuit from a source external to the voltage control circuit.

12. The microphone unit as claimed in claim 11, wherein the voltage control circuit further comprises a storage circuit which stores the set value of the bias voltage.

13. The microphone unit as claimed in claim 12, wherein the storage circuit stores a plurality of set values of the bias voltage.

14. The microphone unit as claimed in claim 12, wherein the voltage control circuit stores a set value of the bias voltage based on a signal input to the terminal for sensitivity adjustment.

15. The microphone unit as claimed in claim 11, wherein the voltage control circuit stores a set value of the bias voltage based on a signal input to the terminal for sensitivity adjustment.

16. A sensitivity adjustment device for a microphone unit which comprises a condenser microphone and a voltage supply circuit which supplies a bias voltage based on a set value to the condenser microphone, comprising:

a comparator which compares an output voltage of the condenser microphone with a reference voltage; and, a control instruction generation circuit which outputs a sensitivity adjustment instruction which adjusts the output voltage of the condenser microphone based on a comparison result of the reference voltage and the output voltage of the condenser microphone, and outputs a storing instruction for storing the set value based on the adjusted output voltage.

* * * * *